US012645562B2

(12) United States Patent
Biswas et al.

(10) Patent No.: US 12,645,562 B2
(45) Date of Patent: Jun. 2, 2026

(54) METHODS, APPARATUSES AND COMPUTER PROGRAM PRODUCTS FOR GENERATING SERVICE HEALTH STATUS DATA OBJECTS AND RENDERING HEALTH STATUS MONITORING USER INTERFACES

(71) Applicants: Atlassian Pty, Ltd., Sydney (AU);
ATLASSIAN US, INC., San Francisco, CA (US)

(72) Inventors: Sandipan Biswas, Kolkata (IN);
Mandeep Kumawat, Bengaluru (IN);
Abhishek Gupta, Kolkata (IN)

(73) Assignees: Atlassian Pty, Ltd., Sydney (AU);
ATLASSIAN US, INC., San Francisco, CA (US)

( * ) Notice: Subject to any disclaimer, the term of this patent is extended or adjusted under 35 U.S.C. 154(b) by 0 days.

(21) Appl. No.: 17/656,529

(22) Filed: Mar. 25, 2022

(65) Prior Publication Data
US 2023/0305944 A1      Sep. 28, 2023

(51) Int. Cl.
*G06F 11/3604*      (2025.01)
*G06F 11/3698*      (2025.01)

(52) U.S. Cl.
CPC ...... *G06F 11/3612* (2013.01); *G06F 11/3616* (2013.01); *G06F 11/3698* (2025.01)

(58) Field of Classification Search
None
See application file for complete search history.

(56) References Cited

U.S. PATENT DOCUMENTS

| | | | | |
|---|---|---|---|---|
| 11,093,518 B1 * | 8/2021 | Lu | ........................ | G06F 11/3476 |
| 11,416,369 B1 * | 8/2022 | Trapani | .............. | G06F 11/3055 |
| 12,455,807 B1 * | 10/2025 | Agarwal | ............ | G06F 11/3698 |
| 2008/0114873 A1 * | 5/2008 | Chakravarty | ....... | G06F 11/3065 709/224 |
| 2015/0212869 A1 * | 7/2015 | Chen | ................... | G06F 11/0706 714/38.1 |
| 2015/0301861 A1 * | 10/2015 | LaChiusa | .............. | G06F 11/328 718/102 |

(Continued)

OTHER PUBLICATIONS

C. B. Hauser and S. Wesner, "Reviewing Cloud Monitoring: Towards Cloud Resource Profiling," 2018 IEEE 11th International Conference on Cloud Computing (CLOUD), San Francisco, CA, USA, 2018, pp. 678-685. (Year: 2018).*

(Continued)

*Primary Examiner* — Andrew M. Lyons
(74) *Attorney, Agent, or Firm* — Alston & Bird LLP

(57) ABSTRACT

Various embodiments herein described are directed to methods, apparatuses and computer program products configured for monitoring and improving the performance of complex network computer systems. In some examples, an example service health status monitoring server may generate service health status data objects based at least in part on system-monitored metric metadata of metric-based alert data object(s) and user-defined mapping metadata of metric-based rule data object(s). Additional examples provide various example user interfaces, such as, but not limited to, health status monitoring user interfaces, that facilitate various user inputs and software operations in a service health status monitoring system.

20 Claims, 16 Drawing Sheets

(56) References Cited

U.S. PATENT DOCUMENTS

| | | | | |
|---|---|---|---|---|
| 2016/0103750 A1* | 4/2016 | Cooper | .................. | G06F 9/542 |
| | | | | 719/328 |
| 2018/0287902 A1* | 10/2018 | Chitalia | .............. | G06F 11/3433 |
| 2020/0112497 A1* | 4/2020 | Yenumulapalli | ........ | H04L 43/10 |
| 2020/0210149 A1 | 7/2020 | Caldwell et al. | | |
| 2021/0117299 A1* | 4/2021 | Yara | ................... | G06F 11/0772 |
| 2023/0126757 A1* | 4/2023 | Roy | ...................... | G06F 11/302 |
| | | | | 714/25 |
| 2023/0251953 A1* | 8/2023 | Joshi | .................... | G06F 11/302 |
| | | | | 714/38.1 |
| 2023/0280996 A1* | 9/2023 | Torres | ...................... | G06F 8/72 |

OTHER PUBLICATIONS

S. Taherizadeh and V. Stankovski, "Quality of Service Assurance for Internet of Things Time-Critical Cloud Applications: Experience with the Switch and Entice Projects," 2017 6th IIAI International Congress on Advanced Applied Informatics (IIAI-AAI), Hamamatsu, Japan, 2017, pp. 289-294. (Year: 2017).*

Apparatuses, Computer-Implemented Methods, and Computer Program Products for Improved Data Event Root Cause Identification and Remediation, U.S. Appl. No. 17/644,988.

Apparatuses, Methods, and Computer Program Products for Predictive Determinations of Causal Change Identification for Service Incidents, U.S. Appl. No. 17/559,563.

Machine-Learning-Based Techniques for Determining Response Team Predictions for Incident Alerts in a Complex Platform, U.S. Appl. No. 17/454,838.

Machine-Learning-Based Techniques for Predictive Monitoring of a Software Application Framework, U.S. Appl. No. 17/127,216.

Machine-Learning-Based Techniques for Predictive Monitoring of a Software Application Framework, U.S. Appl. No. 17/657,237.

Methods, Apparatuses and Computer Program Products for Generating Responder Alert Data Objects Based on Global Alert Policy Data Objects and Inline Alert Policy Data Objects, U.S. Appl. No. 17/448,615.

Predictive Monitoring of Software Application Frameworks Using Machine-Learning-Based Techniques, U.S. Appl. No. 17/486,293.

* cited by examiner

Figure 10:
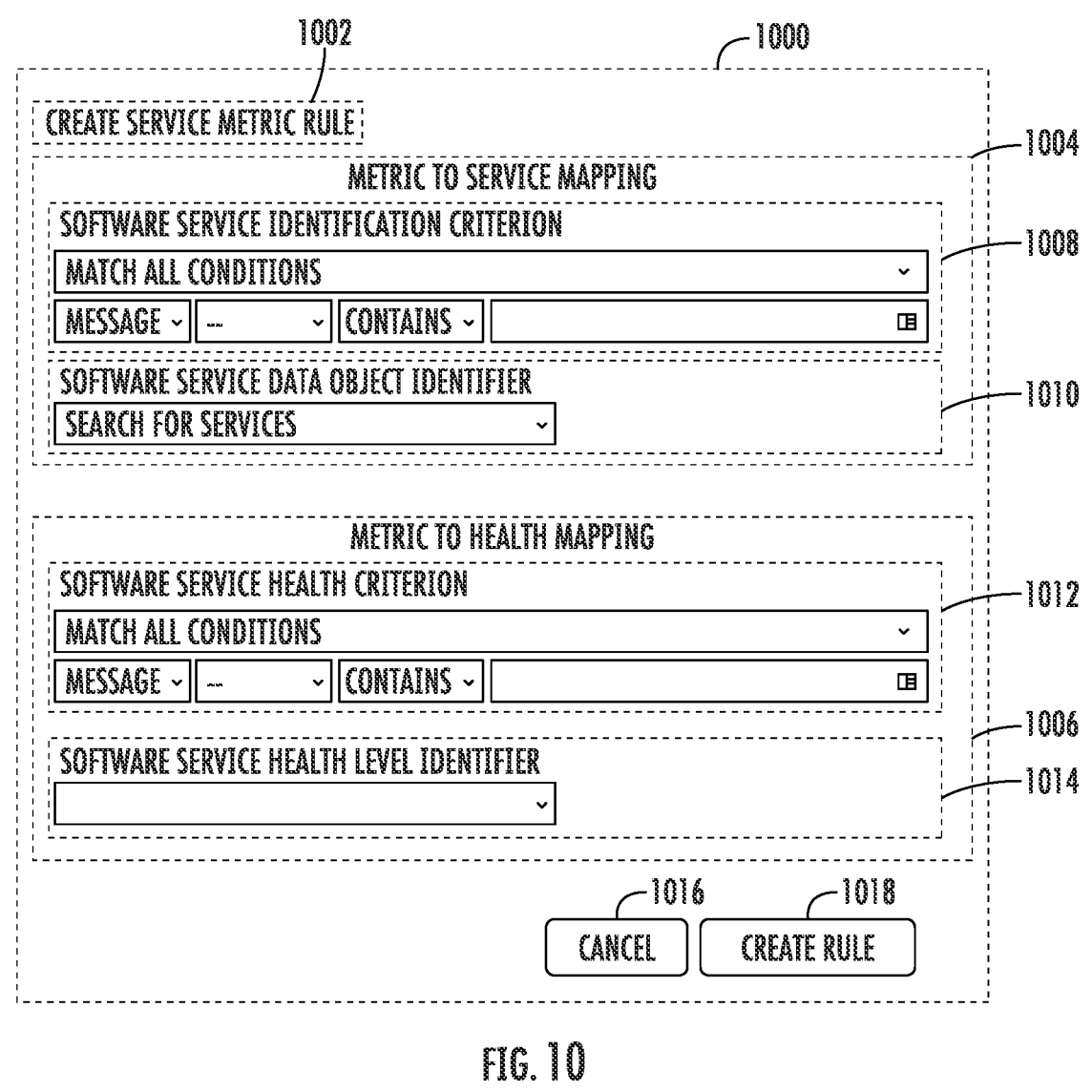

CREATE SERVICE METRIC RULE

METRIC TO SERVICE MAPPING

SOFTWARE SERVICE IDENTIFICATION CRITERION

MATCH ALL CONDITIONS ⌄

| MESSAGE ⌄ | --- ⌄ | CONTAINS ⌄ | ▣ |

SOFTWARE SERVICE DATA OBJECT IDENTIFIER

SEARCH FOR SERVICES ⌄

METRIC TO HEALTH MAPPING

SOFTWARE SERVICE HEALTH CRITERION

MATCH ALL CONDITIONS ⌄

| MESSAGE ⌄ | --- ⌄ | CONTAINS ⌄ | ▣ |

SOFTWARE SERVICE HEALTH LEVEL IDENTIFIER

⌄

CANCEL     CREATE RULE

INCIDENTS / #3
[P1 ⌄]  DEC 21, 2021 1:33 PM (GMT+05-30)  —1402
SERVICES ARE UNHEALTHY
+ ADD TAG

DESCRIPTION  —1404
THE FOLLOWING SERVICES ARE UNHEALTHY

—1406

| ⌄ IMPACTED SERVICES | + ADD IMPACTED SERVICE |
|---|---|
| ⊡ GATEWAYSERVICE_C2 | ♨ STOREFRONT |
| ⊡ IDENTITYSERVICE_C1 | ♨ IDENTITY |
| ⊡ GATEWAYSERVICE_C3 | ♨ STOREFRONT |
| ⊡ GATEWAYSERVICE_C1 | ♨ STOREFRONT |
| ⊡ INVENTORYSERVICE_C2 | ♨ INVENTORY MANAGEMENT |
| ⊡ INVENTORYSERVICE_C3 | ♨ INVENTORY MANAGEMENT ✕ |
| ⊡ ORDERSERVICE_C1 | ♨ ORDER MANAGEMENT |

⌄ POTENTIAL CAUSES

YOU CAN INVESTIGATE CHANGES IN THE IMPACTED SERVICE TO FIND POSSIBLE
ROOT CAUSES.

INVESTIGATE

FIG. 14

METHODS, APPARATUSES AND COMPUTER PROGRAM PRODUCTS FOR GENERATING SERVICE HEALTH STATUS DATA OBJECTS AND RENDERING HEALTH STATUS MONITORING USER INTERFACES

BACKGROUND

Applicant has identified many technical deficiencies and problems associated with determining and monitoring health and status of software service data objects in complex network computer systems.

BRIEF SUMMARY

In general, embodiments of the present disclosure provide methods, apparatus, systems, computing devices, and/or the like for monitoring health and performance of complex network computer systems. In particular, embodiments of the present disclosure may programmatically generate service health status data objects associated with one or more software service data objects in a cloud-based software service system.

In accordance with various embodiments of the present disclosure, an apparatus for generating service health status data objects associated with one or more software service data objects in a cloud-based software service system is provided. The apparatus comprises at least one processor and at least one non-transitory memory comprising program code, the at least one non-transitory memory and the program code being configured to, with the at least one processor, cause the apparatus to at least: receive one or more metric-based alert data objects associated with the cloud-based software service system, wherein the one or more metric-based alert data objects comprise system-monitored metric metadata; retrieve one or more metric-based rule data objects associated with the one or more software service data objects, wherein the one or more metric-based rule data objects comprise user-defined mapping metadata; generate a service health status data object based at least in part on the system-monitored metric metadata and the user-defined mapping metadata, and cause rendering a health status monitoring user interface.

In some embodiments, when generating a service health status data object based at least in part on the system-monitored metric metadata and the user-defined mapping metadata, the at least one non-transitory memory and the program code are configured to, with the at least one processor, cause the apparatus to determine that at least one of the one or more metric-based alert data objects is associated with a software service data object of the one or more software service data objects, and generate service health status metadata of the service health status data object, wherein the service health status metadata indicates a software service health level of the software service data object.

In some embodiments, the health status monitoring user interface comprises a service health status user interface object corresponding to the software service data object based at least in part on the service health status data object.

In some embodiments, the one or more metric-based alert data objects comprise at least one of one or more system alert data objects or one or more system metric data objects.

In some embodiments, the user-defined mapping metadata comprises metric-to-service mapping indicator and metric-to-health mapping indicator.

In some embodiments, the metric-to-service mapping indicator comprises one or more software service identification criteria and one or more software service data object identifiers, wherein each of the one or more software service identification criteria corresponds to one of the one or more software service data object identifiers. In some embodiments, each of the one or more software service data object identifiers is associated with one of the one or more software service data objects.

In some embodiments, when determining that the at least one of the one or more metric-based alert data objects is associated with the software service data object, the at least one non-transitory memory and the program code are configured to, with the at least one processor, cause the apparatus to: extract the system-monitored metric metadata from the one or more metric-based alert data objects; determine whether the system-monitored metric metadata satisfies a software service identification criterion of the one or more software service identification criteria; and in response to determining that the system-monitored metric metadata satisfies the software service identification criterion: determine a software service data object identifier corresponds to the software service identification criterion; and select the software service data object corresponding to the software service data object identifier.

In some embodiments, the metric-to-health mapping indicator comprises one or more software service health criteria and one or more software service health level identifiers. In some embodiments, each of the one or more software service health criteria corresponds to one of the one or more software service health level identifiers. In some embodiments, each of the one or more software service health level identifiers indicates a corresponding software service health level.

In some embodiments, when generating the service health status metadata of the service health status data object, the at least one non-transitory memory and the program code are configured to, with the at least one processor, cause the apparatus to: extract the system-monitored metric metadata from the one or more metric-based alert data objects; determine whether the system-monitored metric metadata satisfies a software service health criterion of the one or more software service health criteria; and in response to determining that the system-monitored metric metadata satisfies the software service health criterion: determine a software service health level identifier corresponds to the software service health criterion; and determine the service health status metadata based at least in part on the software service health level identifier.

In some embodiments, the at least one non-transitory memory and the program code are configured to, with the at least one processor, cause the apparatus to: retrieve a service dependency data object associated with the cloud-based software service system, wherein the service dependency data object comprises service dependency metadata associated with the one or more software service data objects; determine at least one related software service data object associated with the software service data object based at least in part on the service dependency metadata of the service dependency data object; determine at least one related service health status data object associated with the at least one related software service data object, wherein the at least one related service health status data object indicates at least one related software service health level of the at least one related software service data object; and adjust, based at least in part on the at least one related service health status data object, the service health status metadata of the service health status data object.

In some embodiments, when adjusting the service health status metadata of the service health status data object based at least in part on the at least one related service health status data object, the at least one non-transitory memory and the program code are configured to, with the at least one processor, cause the apparatus to: determine whether the at least one related service health status data object indicates a healthy status or an unhealthy status.

In some embodiments, the at least one non-transitory memory and the program code are configured to, with the at least one processor, cause the apparatus to: in response to determining that the at least one related service health status data object indicates the unhealthy status, decrease the software service health level associated with the software service data object.

In some embodiments, the at least one non-transitory memory and the program code are configured to, with the at least one processor, cause the apparatus to: in response to determining that the at least one related service health status data object indicates the healthy status, increase the software service health level associated with the software service data object.

In accordance with various embodiments of the present disclosure, a computer-implemented method for generating service health status data objects associated with one or more software service data objects in a cloud-based software service system is provided. In some embodiments, the computer-implemented method comprises receiving one or more metric-based alert data objects associated with the cloud-based software service system, wherein the one or more metric-based alert data objects comprise system-monitored metric metadata; retrieving one or more metric-based rule data objects associated with the one or more software service data objects, wherein the one or more metric-based rule data objects comprise user-defined mapping metadata; generating a service health status data object based at least in part on the system-monitored metric metadata and the user-defined mapping metadata; and causing rendering a health status monitoring user interface. In some embodiments, when generating the service health status data object based at least in part on the system-monitored metric metadata and the user-defined mapping metadata, the computer-implemented method further comprises: determining that at least one of the one or more metric-based alert data objects is associated with a software service data object of the one or more software service data objects, and generating service health status metadata of the service health status data object, wherein the service health status metadata indicates a software service health level of the software service data object. In some embodiments, the health status monitoring user interface comprises a service health status user interface object corresponding to the software service data object based at least in part on the service health status data object.

In accordance with various embodiments of the present disclosure, a computer program product for generating service health status data objects associated with one or more software service data objects in a cloud-based software service system is provided. In some embodiments, the computer program product comprises at least one non-transitory computer-readable storage medium having computer-readable program code portions stored therein, the computer-readable program code portions comprising an executable portion configured to: receive one or more metric-based alert data objects associated with the cloud-based software service system, wherein the one or more metric-based alert data objects comprise system-monitored metric metadata; retrieve one or more metric-based rule data objects associated with the one or more software service data objects, wherein the one or more metric-based rule data objects comprise user-defined mapping metadata; generate a service health status data object based at least in part on the system-monitored metric metadata and the user-defined mapping metadata; and cause rendering a health status monitoring user interface. In some embodiments, when generating the service health status data object based at least in part on the system-monitored metric metadata and the user-defined mapping metadata, the computer-readable program code portions comprise the executable portion configured to: determine that at least one of the one or more metric-based alert data objects is associated with a software service data object of the one or more software service data objects, and generate service health status metadata of the service health status data object, wherein the service health status metadata indicates a software service health level of the software service data object. In some embodiments, the health status monitoring user interface comprises a service health status user interface object corresponding to the software service data object based at least in part on the service health status data object.

The above summary is provided merely for purposes of summarizing some example embodiments to provide a basic understanding of some aspects of the disclosure. Accordingly, it will be appreciated that the above-described embodiments are merely examples. It will be appreciated that the scope of the disclosure encompasses many potential embodiments in addition to those here summarized, some of which will be further described below.

BRIEF DESCRIPTION OF THE DRAWINGS

Figure 1:
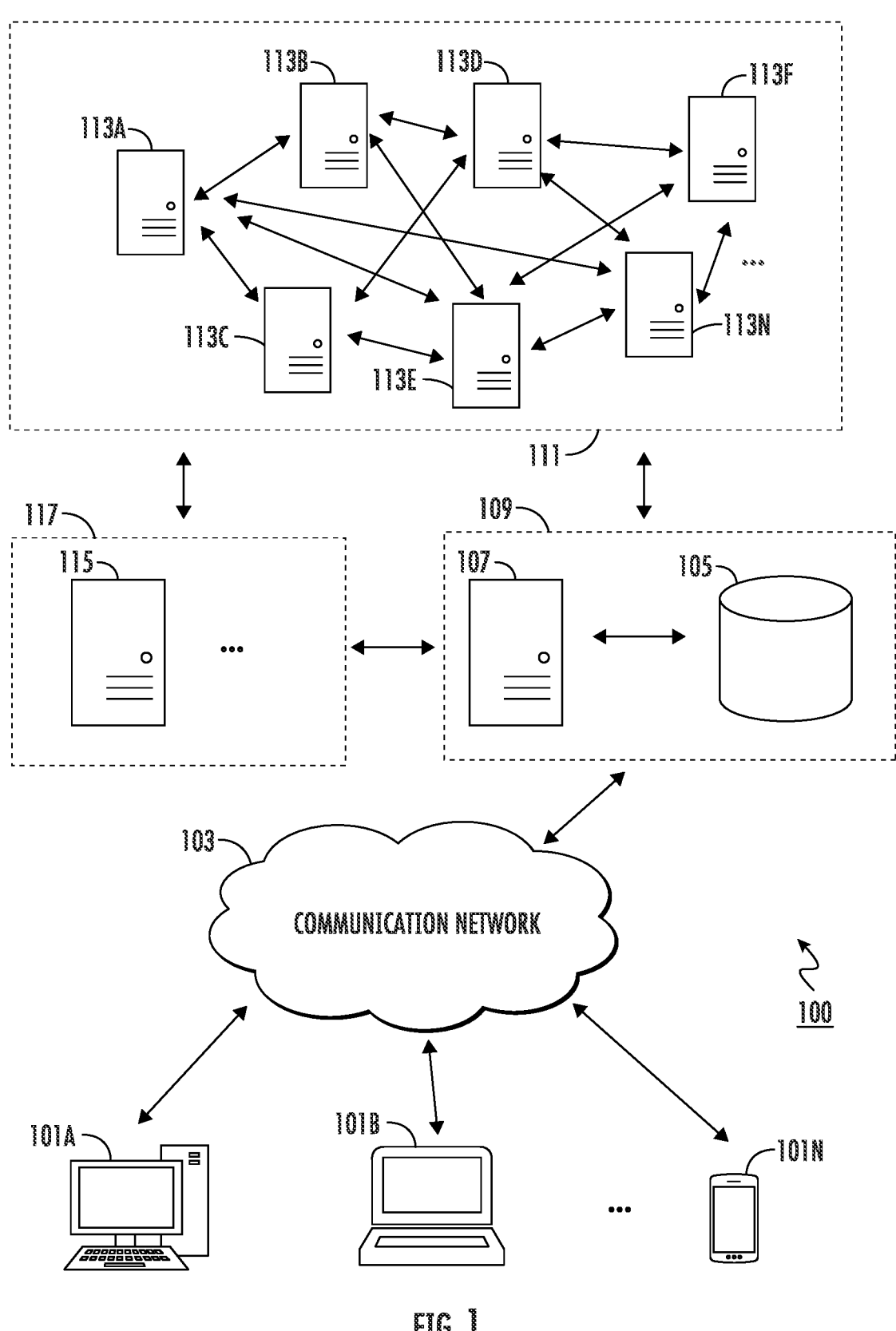
Figure 2:
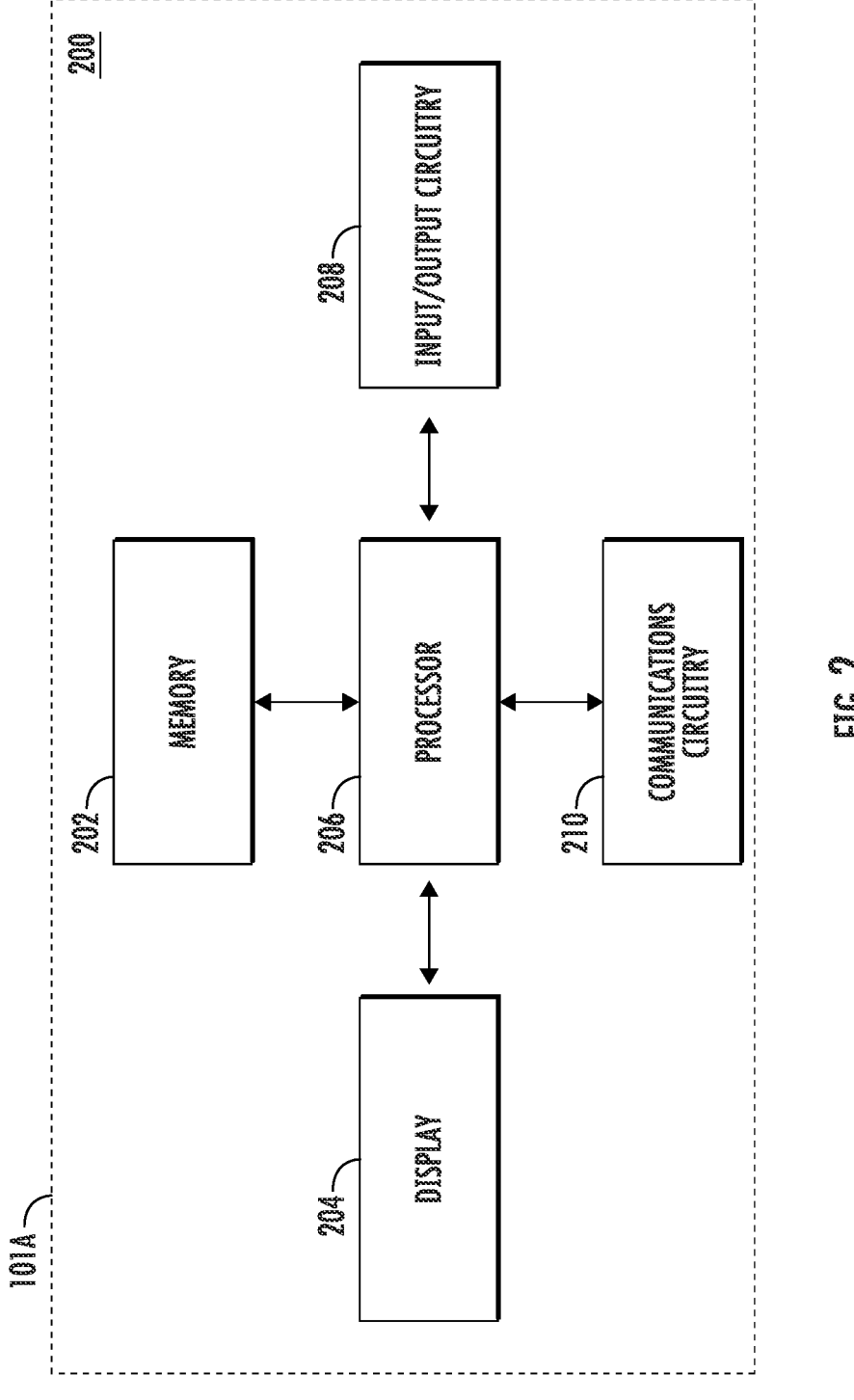
Figure 3:
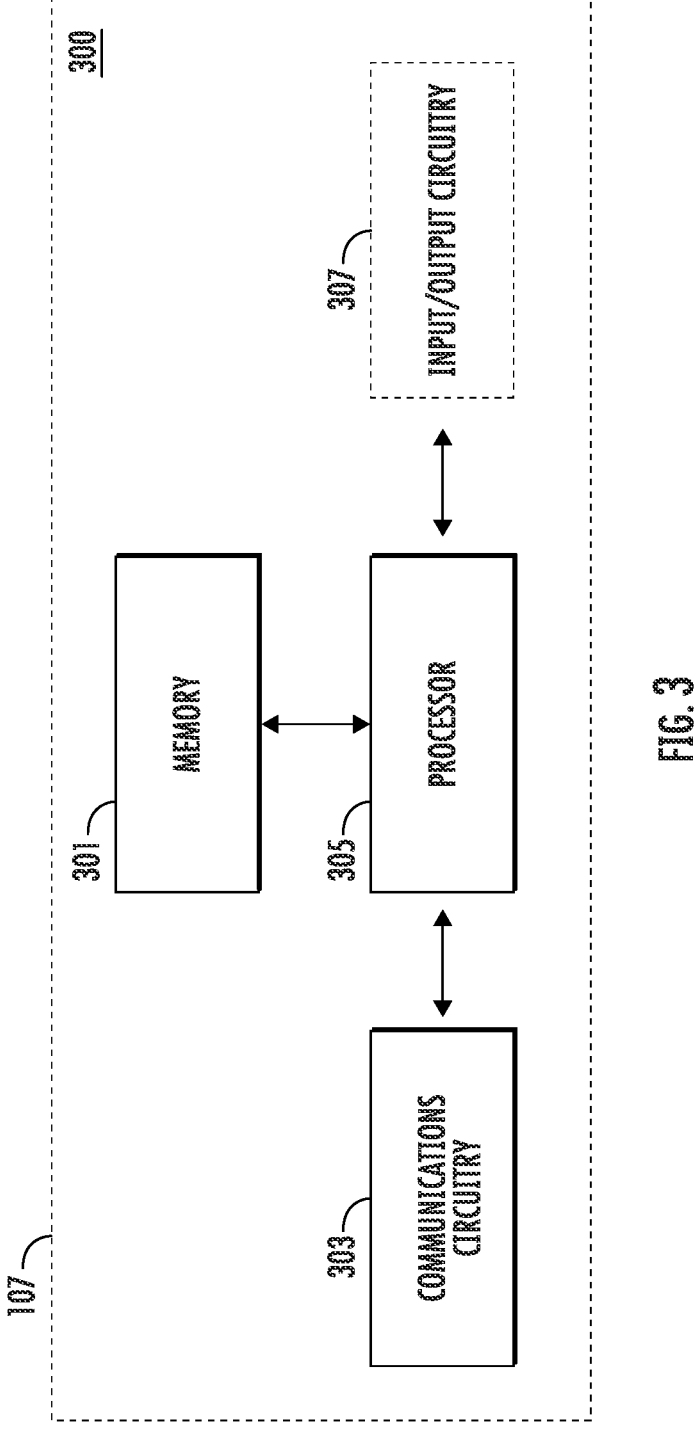
Figure 4:
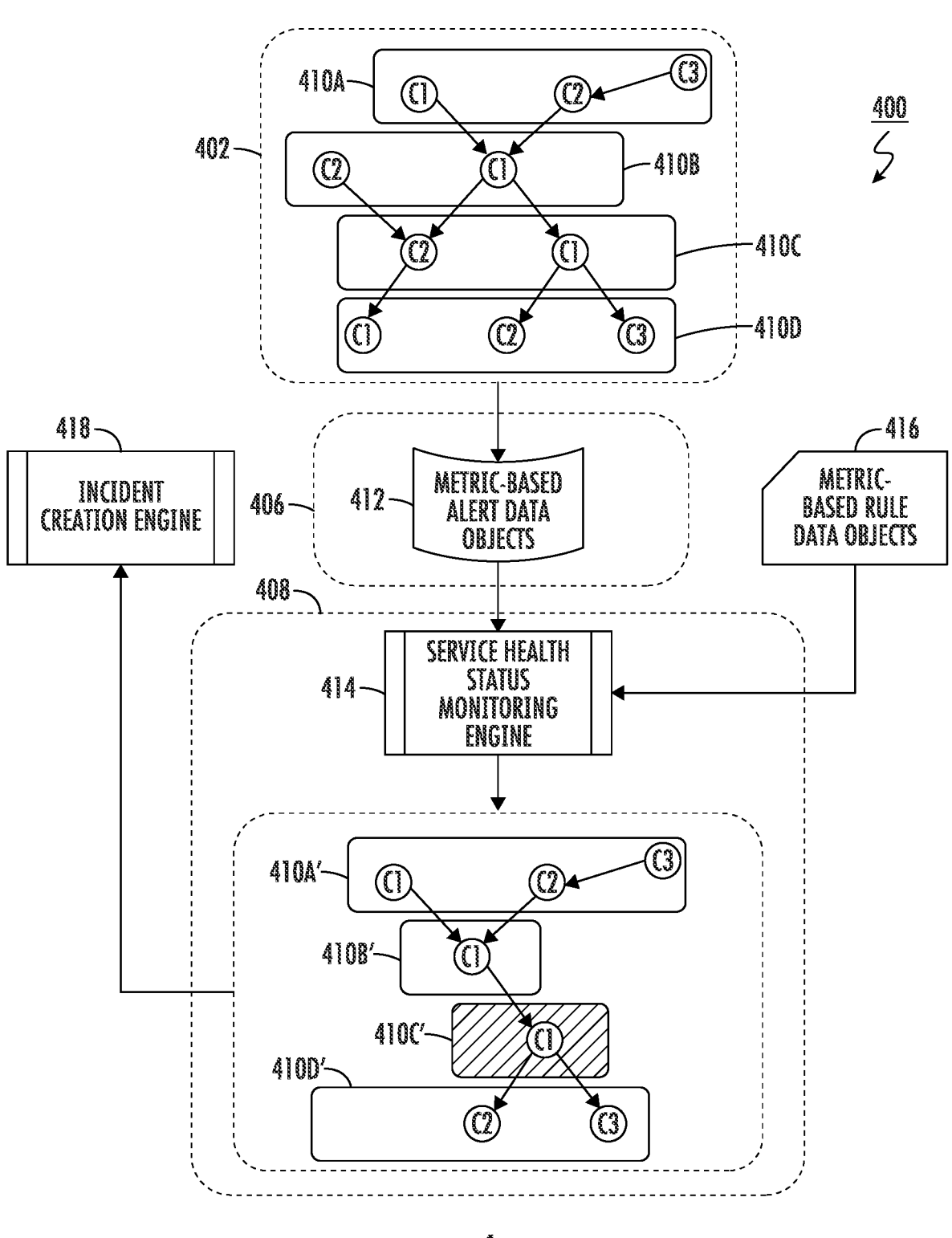
Figure 5:
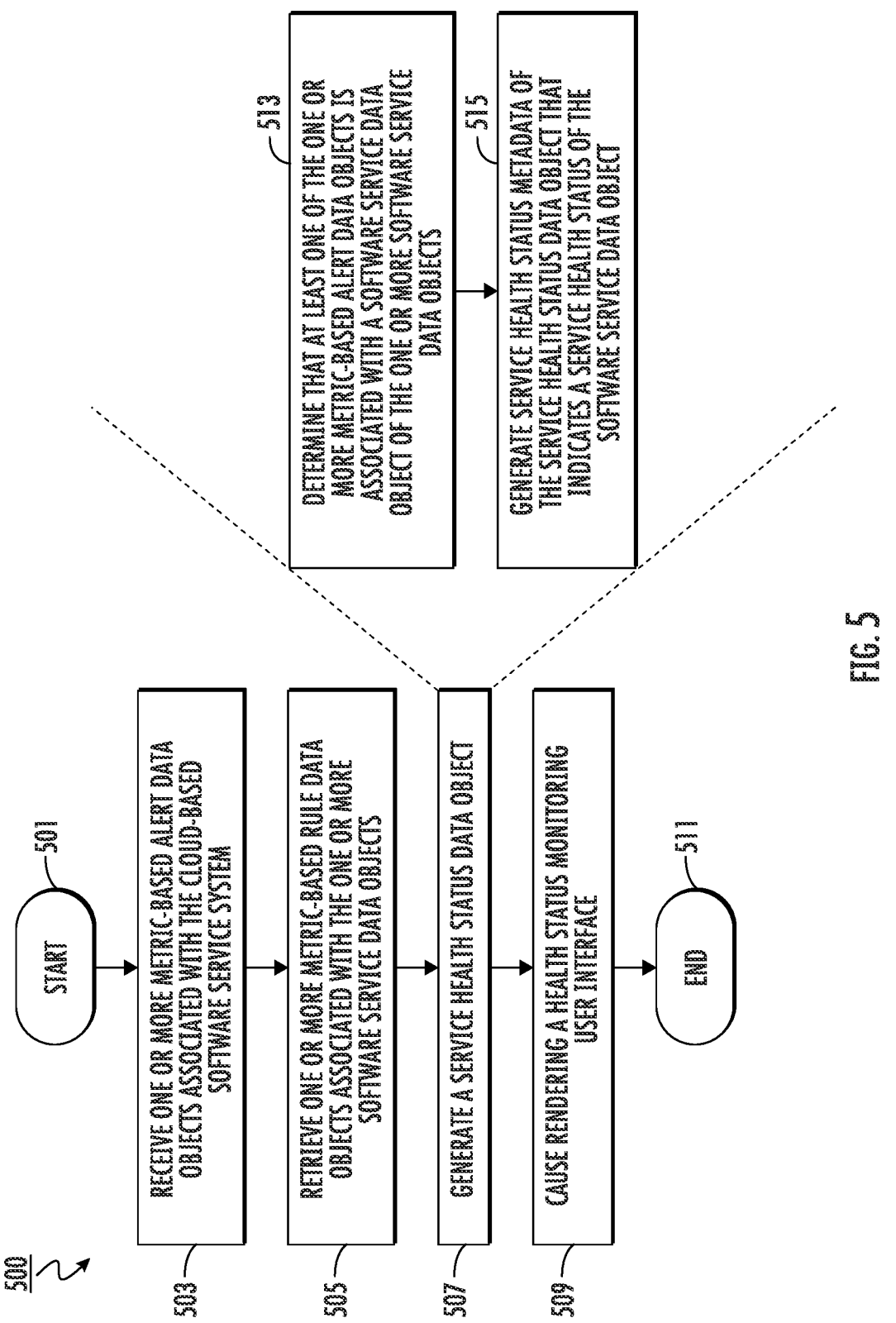
Figure 6A:
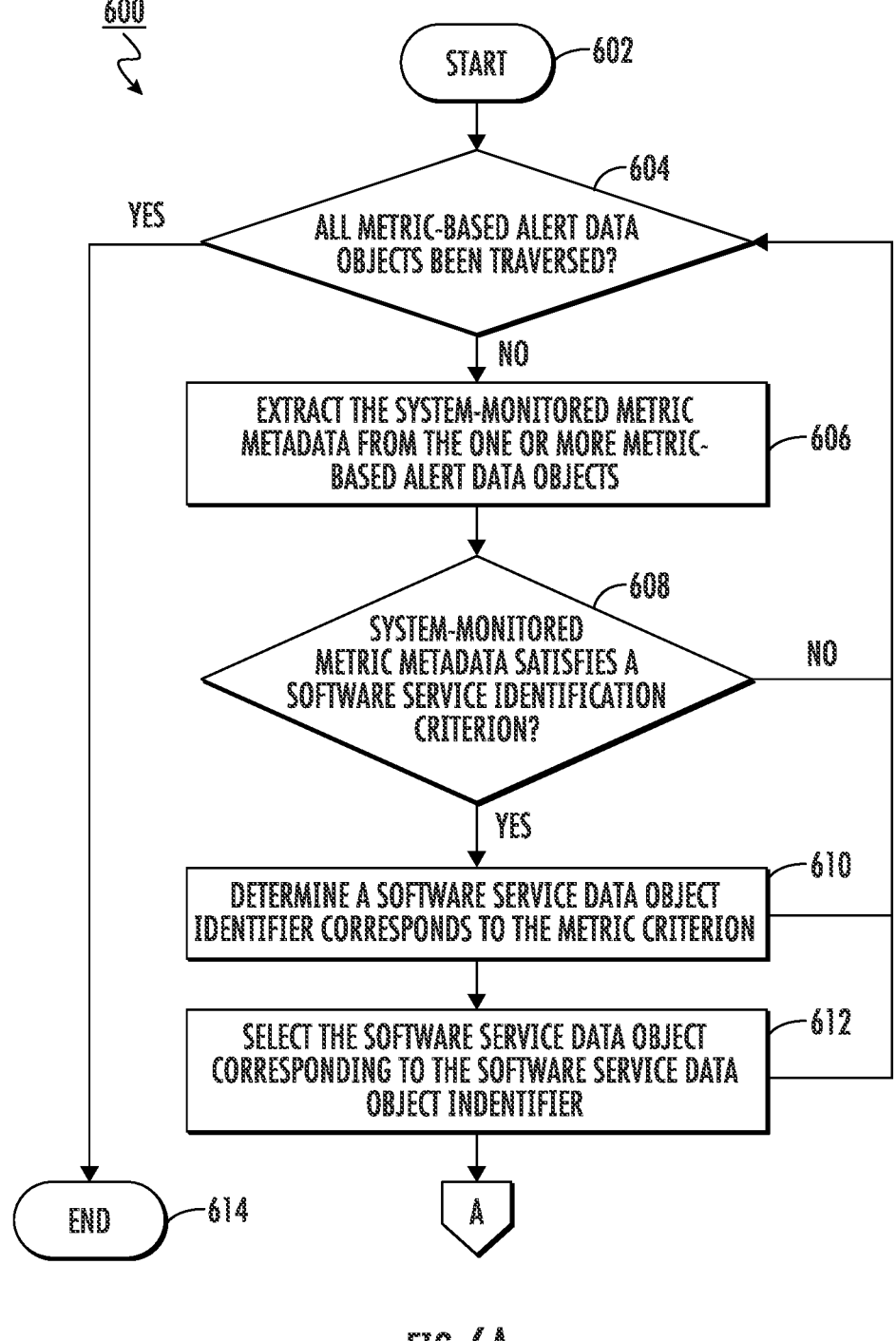
Figure 6B:
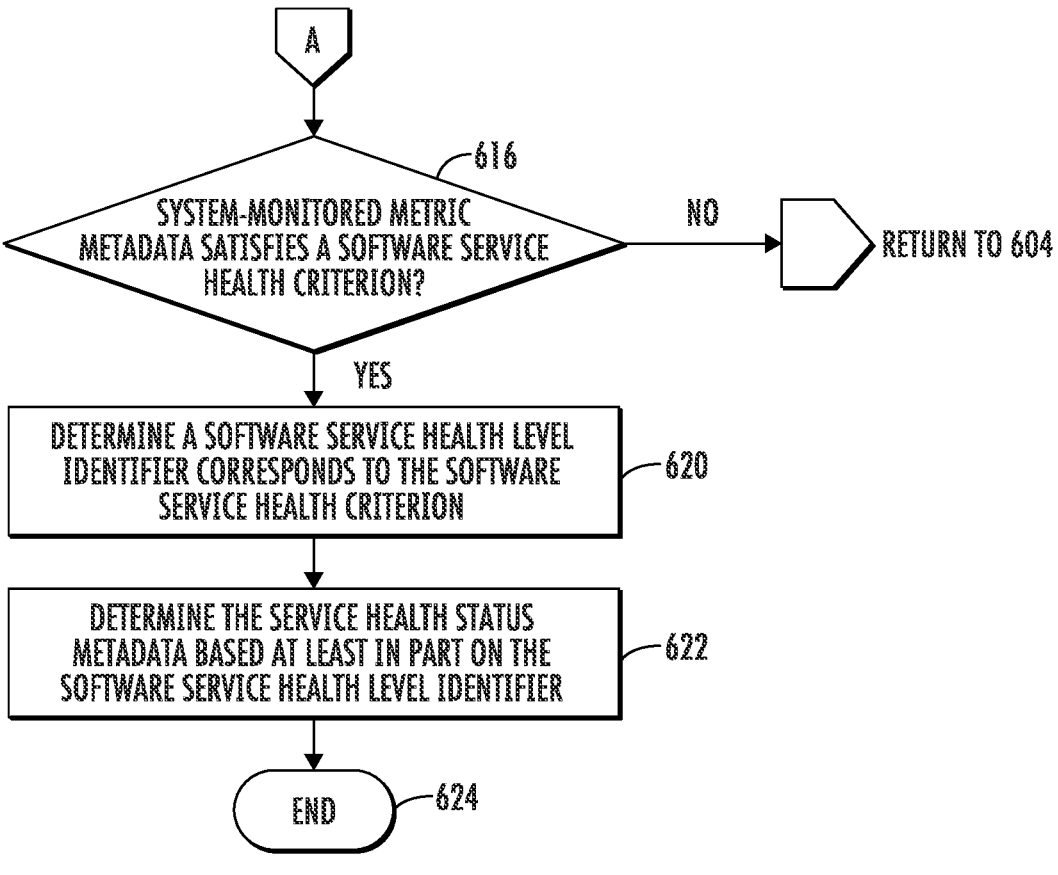
Figure 7A:
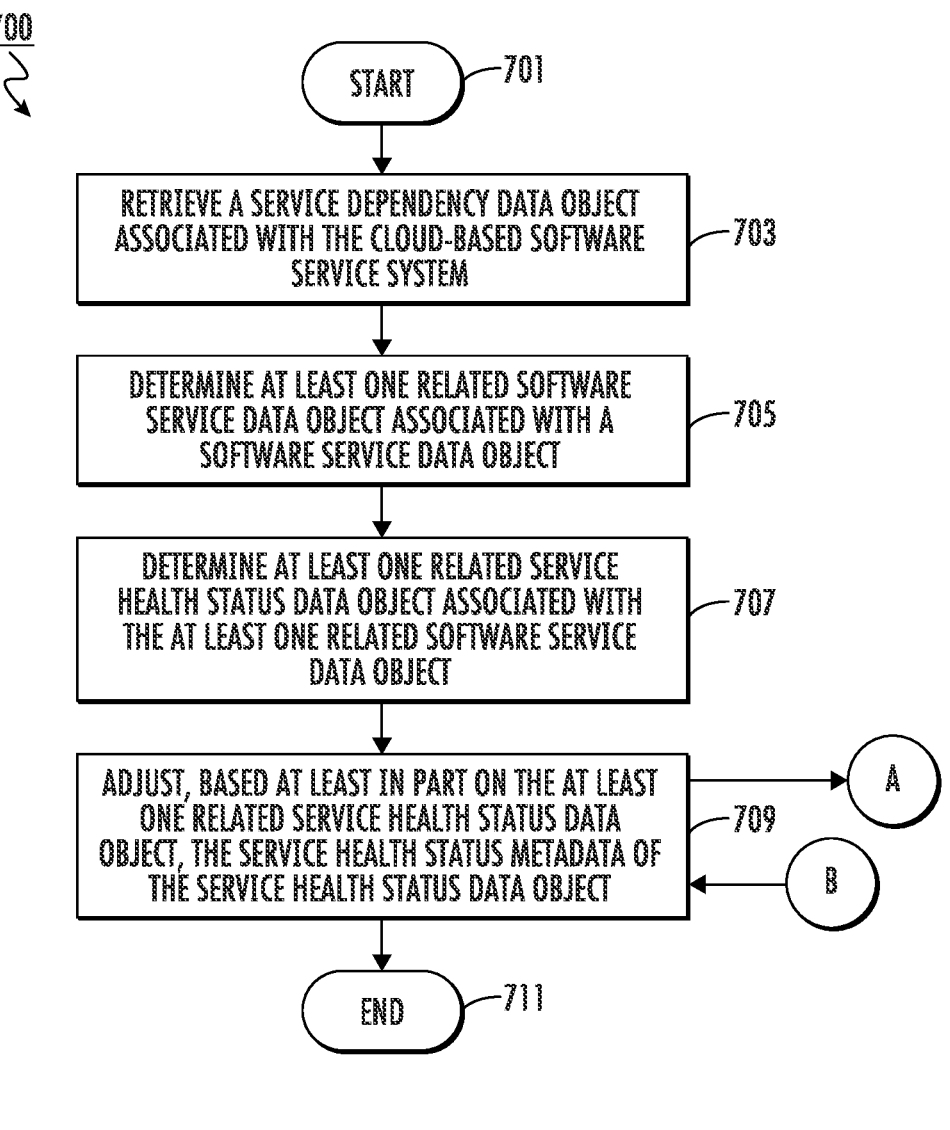
Figure 7B:
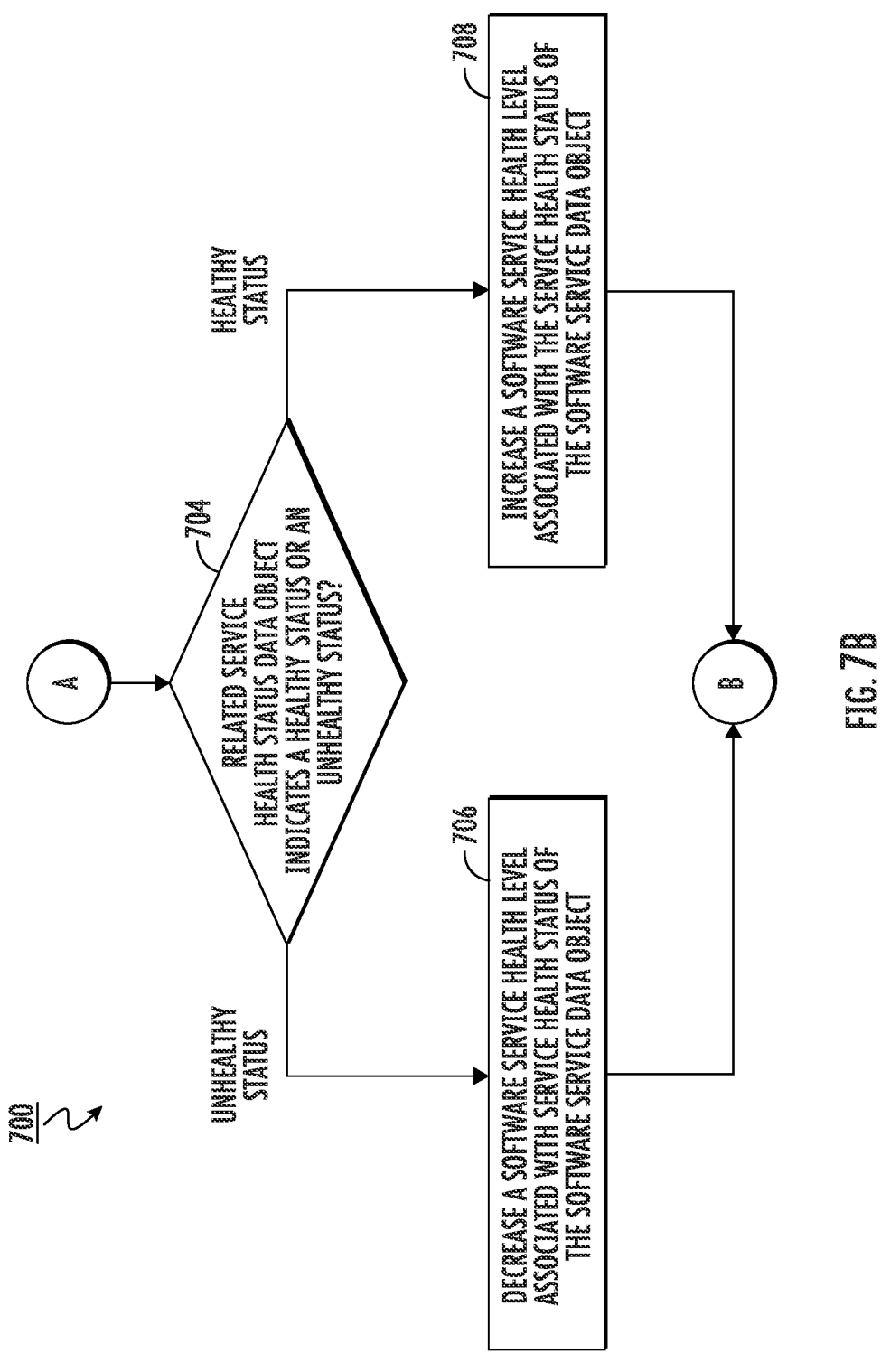
Figure 8:
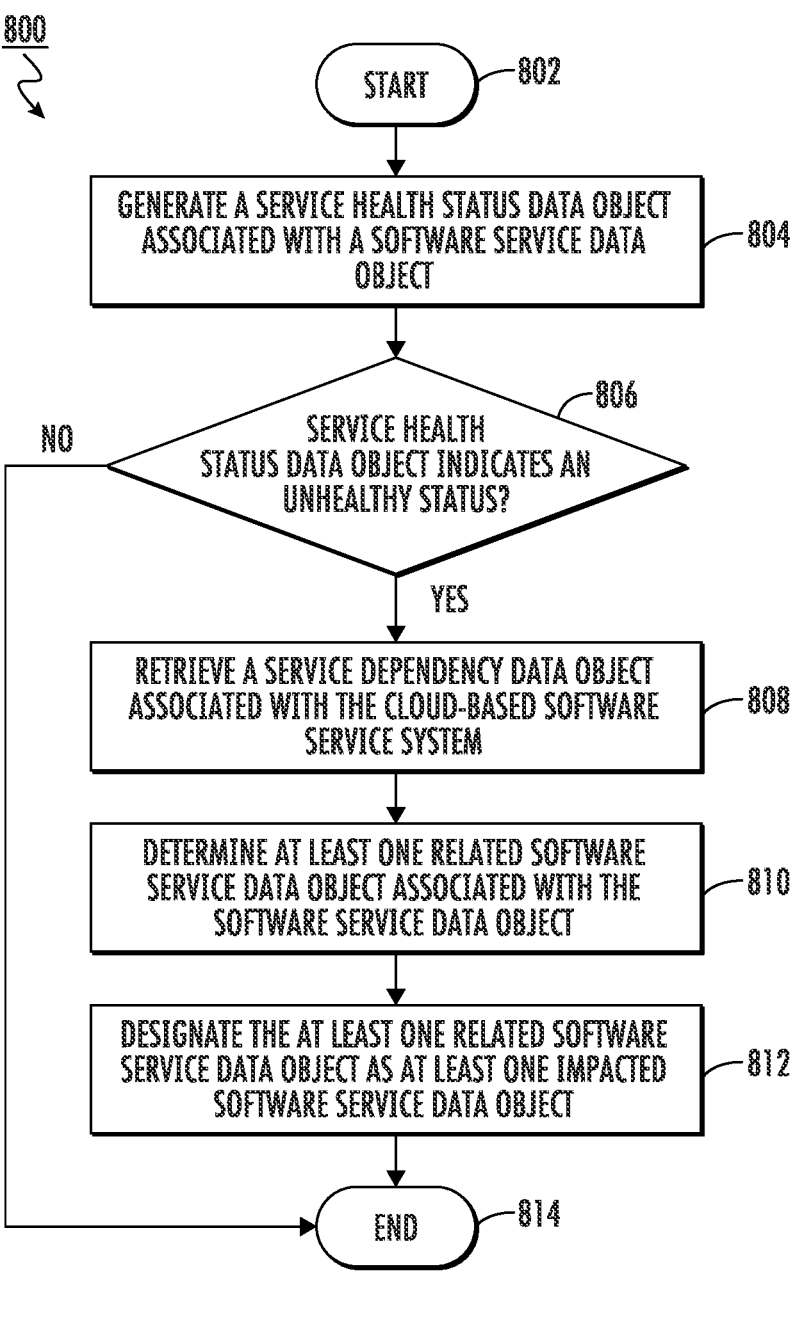
Figure 9:
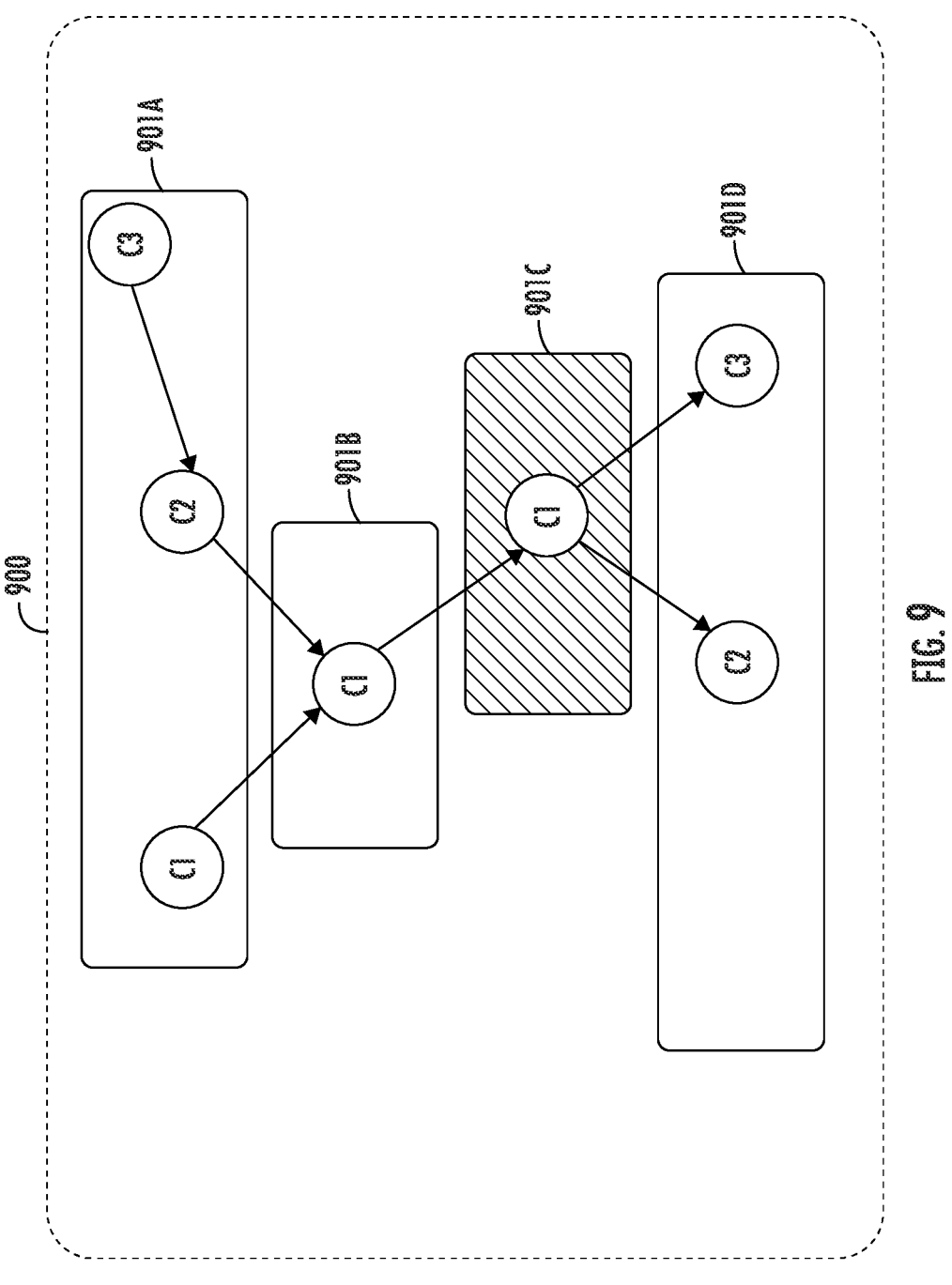
Figure 11:
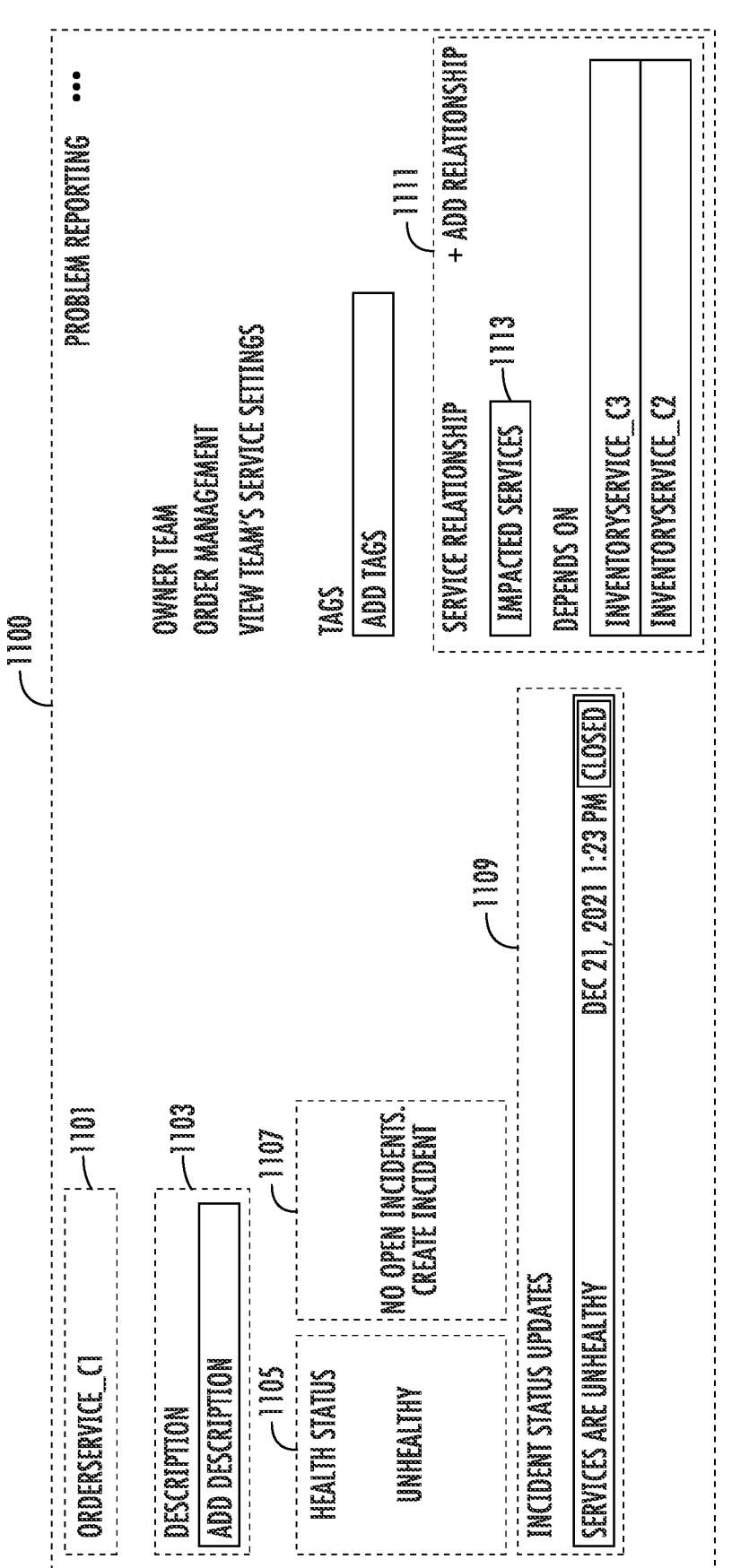
Figure 12:
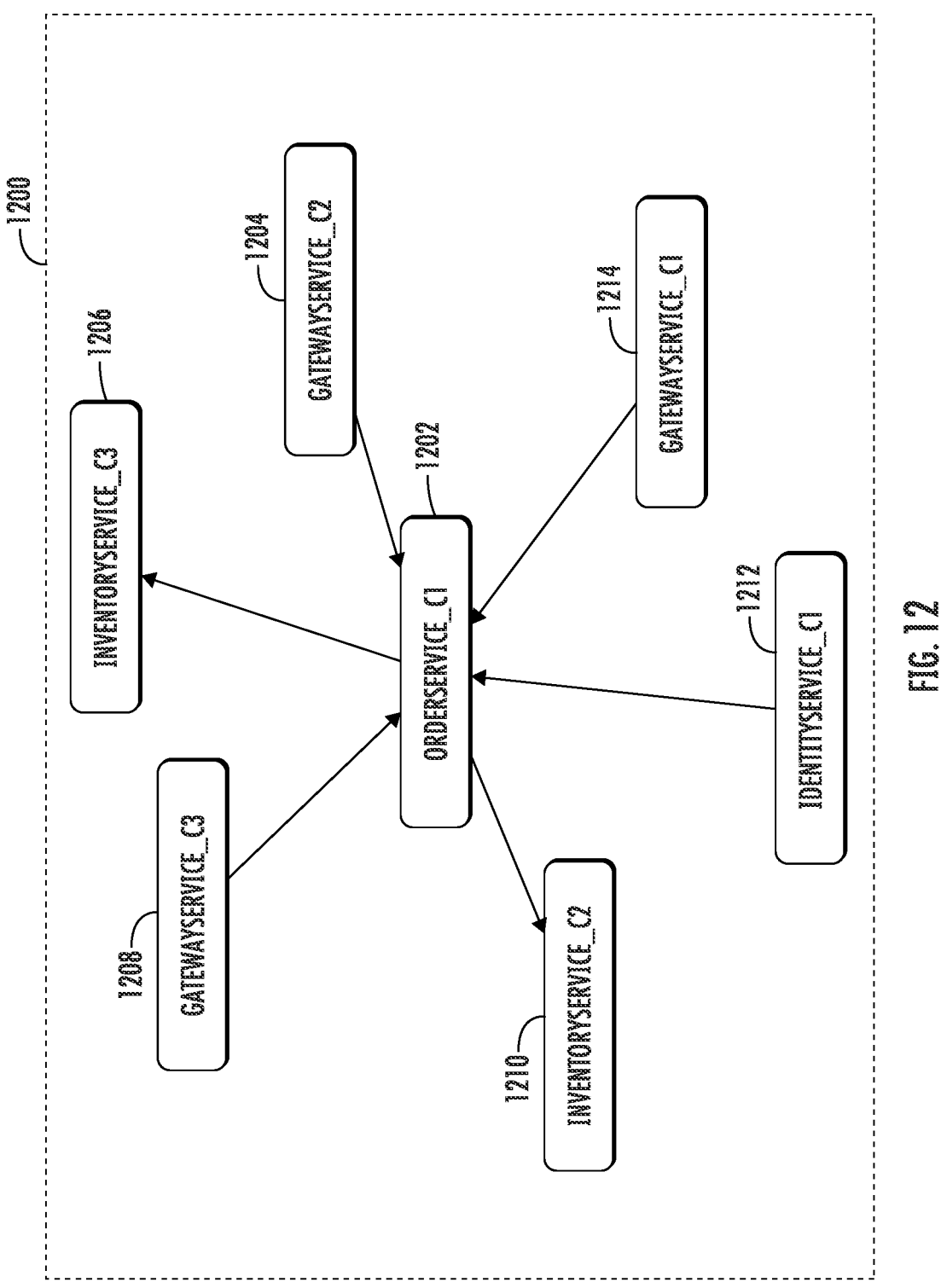
Figure 13:
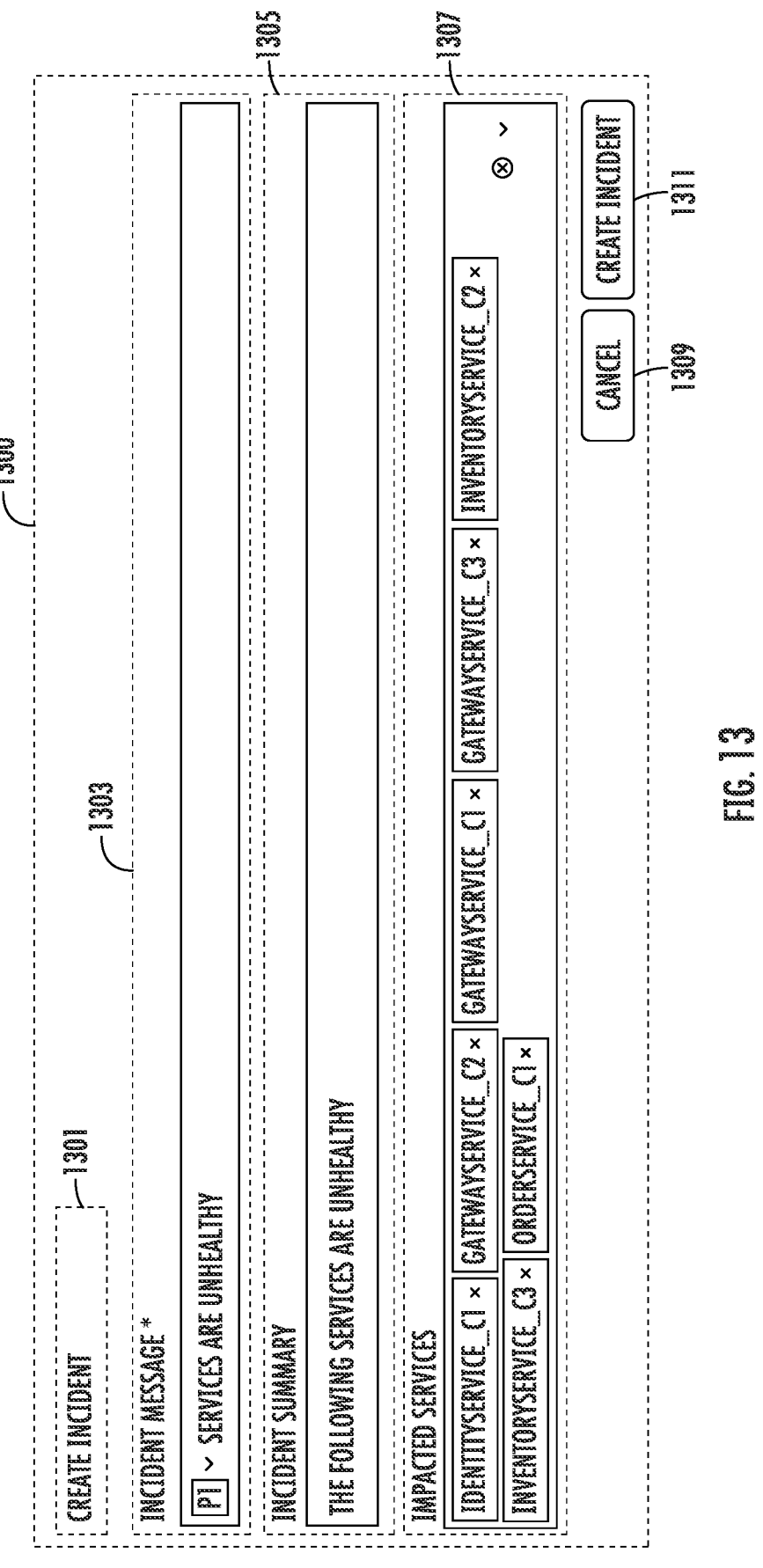

Having thus described some embodiments in general terms, references will now be made to the accompanying drawings, which are not necessarily drawn to scale, and wherein:

FIG. 1 is an example system architecture diagram illustrating an example cloud-based software service infrastructure in accordance with some embodiments of the present disclosure;

FIG. 2 is an example infrastructure diagram illustrating an example computing device (for example, an example client device) in accordance with some embodiments of the present disclosure;

FIG. 3 is an example infrastructure diagram illustrating an example computing device (for example, an example cloud-based software service server) in accordance with some embodiments of the present disclosure;

FIG. 4 is an example data flow diagram illustrating example data flows associated with an example service health status monitoring system in accordance with some embodiments of the present disclosure;

FIG. 5 is an example flow chart illustrating an example method of generating a service health status data object and rendering a health status monitoring user interface in accordance with some embodiments of the present disclosure;

FIG. 6A and FIG. 6B are example flow charts illustrating an example method of generating a service health status data object in accordance with some embodiments of the present disclosure;

FIG. 7A and FIG. 7B are example flow charts illustrating an example method of adjusting the service health status metadata of the service health status data object in accordance with some embodiments of the present disclosure;

FIG. 8 is an example flow chart illustrating an example method of identifying impacted software service data objects in accordance with some embodiments of the present disclosure;

FIG. 9 is an example block diagram illustrating an example service dependency data object in accordance with some embodiments of the present disclosure;

FIG. 10 illustrates example user interface elements of an example metric-based rule data object creation user interface in accordance with some embodiments of the present disclosure;

FIG. 11 illustrates example user interface elements of an example health status monitoring user interface in accordance with some embodiments of the present disclosure;

FIG. 12 illustrates example user interface elements of an example service dependency graph user interface in accordance with some embodiments of the present disclosure;

FIG. 13 illustrates example user interface elements of an example incident data object creation user interface in accordance with some embodiments of the present disclosure; and FIG. 14 illustrates example user interface elements of an example incident data object user interface in accordance with some embodiments of the present disclosure.

DETAILED DESCRIPTION OF VARIOUS EMBODIMENTS

Various embodiments of the present disclosure are described more fully hereinafter with reference to the accompanying drawings, in which some, but not all embodiments of the disclosure are shown. Indeed, the disclosure may be embodied in many different forms and should not be construed as limited to the embodiments set forth herein. Rather, these embodiments are provided so that this disclosure will satisfy applicable legal requirements. The term "or" is used herein in both the alternative and conjunctive sense, unless otherwise indicated. The terms "illustrative," "example," and "exemplary" are used to be examples with no indication of quality level. Like numbers refer to like elements throughout.

The term "comprising" means "including but not limited to," and should be interpreted in the manner it is typically used in the patent context. Use of broader terms such as "comprises," "includes," and "having" should be understood to provide support for narrower terms such as "consisting of," "consisting essentially of," and "comprised substantially of."

The phrases "in one embodiment," "according to one embodiment," "in some examples," "for example," and the like generally mean that the particular feature, structure, or characteristic following the phrase may be included in an embodiment of the present disclosure, and may be included in more than one embodiment of the present disclosure (importantly, such phrases do not necessarily refer to the same embodiment).

Overview

Various embodiments of the present disclosure relate generally to dynamically generating service health status data objects that indicate health levels associated with software services provided by a cloud-based software service system and rendering health status monitoring user interfaces. For example, various embodiments of the present disclosure may generate one or more service health status data objects based at least in part on one or more metric-based alert data objects and one or more metric-based rule data objects.

In the present disclosure, a "cloud-based software service system" is a cloud-based software platform and associated hardware that are configured to support and maintain various software services. For example, an example cloud-based software service system may comprise a plurality of cloud-based software service servers that perform data computing, data management, data monitoring, data storage, data migration, data development, data analytics, data deployment, and/or the like. The plurality of cloud-based software service servers are in data communications with one another, and each of the one or more cloud-based software service servers may comprise one or more cloud software applications that are hosted on the corresponding cloud-based software service server. In some embodiments, the one or more cloud-based software service servers may execute the hosted cloud software applications so as to perform or carry out the software services.

"Software service" refers to a software related service that is provided by the cloud-based software service system. Examples of the software-based service may include, but not limited to, gateway services, identity service, order service, inventory service, and/or the like.

For example, an example software service that is provided by the cloud-based software service system may be a gateway service. In such an example, the gateway service may enable transformations, routing, delivering and common processing of data and/or information to, from, and/or across services in the cloud-based software service system.

As another example, an example software service that is provided by the cloud-based software service system may be an identity service. In such an example, the identity service may authenticate the identities of users who access the cloud-based software service system, and may provide the right access privileges of software applications, files, and other resources to the right users.

As another example, an example software service that is provided by the cloud-based software service system may be an order service. In some embodiments, the order service may allow users of the cloud-based software service system to conduct one or more transactions between and/or among one another and/or to complete one or more orders. For example, the order service may provide user interfaces, communication protocols, and/or the like that allow buyers and sellers to communicate and complete transactions of goods and services.

As another example, an example software service that is provided by the cloud-based software service system may be an inventory service. In some embodiments, the inventory service may determine, calculate, track, and/or monitor inventories for completing transactions and orders through the cloud-based software service system. For example, the inventory service may store data and/or information in one or more databases that indicates the amounts of goods and/or services remaining for completing the transactions, the locations of the goods and/or services remaining for completing the transactions, and/or the like.

While the description above provides several example software services that may be provided by a cloud-based software service system, it is noted that the scope of the present disclosure is not limited to the description above. In some examples, an example cloud-based software service system may provide one or more additional and/or alternative software services.

Cloud-based software service systems are faced by many technical challenges and plagued by many technical difficulties.

For example, it is important to determine and monitor the health levels associated with the software services provided by a cloud-based software service system. An example software service health level of an example software service may indicate a reliability degree of the example software service. In such an example, the software service health level illustrates how consistently the cloud-based software service system can carry out and provide the example software service.

As an example, the cloud-based software service system may provide a gateway service as described above. In some embodiments, the software service health level of the gateway service may indicate a degree to which the cloud-based software service system can respond to software service requests to transform, route, and/or deliver data and/or information to, from, and/or across services in the cloud-based software service system. The higher the software service health level, the more likely that the cloud-based software service system can respond to the software service request for the gateway service. The lower the software service health level, the less likely that the cloud-based software service system can respond to the software service request for the gateway service.

Additionally, or alternatively, an example software service health level of an example software service may indicate a success degree of the example software service. In such an example, the software service health level illustrates how successfully the cloud-based software service system can carry out and provide the example software service.

Continuing from the gateway service example above, the software service health level of the gateway service may indicate a degree to which the cloud-based software service system can provide a correct response to software service requests to transform, route, and/or deliver data and/or information to, from, and/or across services in the cloud-based software service system. The higher the software service health level, the more likely that the cloud-based software service system can provide a correct response to the software service request for the gateway service. The lower the software service health level, the less likely that the cloud-based software service system can provide a correct response to a request for gateway service.

Additionally, or alternatively, an example software service health level of an example software service may indicate a speed of providing the example software service. In such an example, the software service health level illustrates how fast the cloud-based software service system can carry out and provide the example software service in response to a software service request.

Continuing from the gateway service example above, the software service health level of the gateway service may indicate a speed at which the cloud-based software service system can respond to software service requests to transform, route, and/or deliver data and/or information to, from, and/or across services in the cloud-based software service system. The higher the software service health level, the more quickly that the cloud-based software service system can provide the gateway service. The lower the software service health level, the slower the software service can provide the gateway service.

However, it is technically challenging to determine the health levels associated with the software services provided by a cloud-based software service system. For example, an external service system metric monitoring platform may be in data communications with the cloud-based software service system so as to provide metrics that are associated with the cloud-based software service system. Such metrics may include CPU utilization rates of servers in the cloud-based software service system, error messages returned from servers in the cloud-based software service system, and/or the like. Because the external service system metric monitoring platform is external to the cloud-based software service system, there is no connection between the metrics generated by the external service system metric monitoring platform and the software services provided by the cloud-based software service system.

For example, a metric generated by the external service system metric monitoring platform may indicate that a server from the cloud-based software service system returned an error message. However, the metric does not describe or indicate which software services of the cloud-based software service system are impacted by the error message, and how much the error message affects the health levels of the software services.

In contrast, various embodiments of the present disclosure overcome the above-referenced technical challenges, and provide various technical improvements in computer-related technologies.

For example, various examples of the present disclosure generate service health status data objects that indicate health levels associated with the software services of the cloud-based software service system by utilizing one or more metric-based alert data objects and one or more metric-based rule data objects. In some embodiments, the metric-based alert data objects may comprise system-monitored metric metadata that indicates one or more metrics, alerts, and/or notifications associated with the cloud-based software service system and monitored by a service system metric monitoring platform. In some embodiments, the metric-based rule data objects may comprise user-defined mapping metadata that provide correlations and/or mappings between metric-based alert data objects and software service data objects of the cloud-based software service system, as well as correlations and/or mappings between metric-based alert data objects and one or more health levels of software services. As such, by utilizing the metric-based alert data objects and the metric-based rule data objects, various embodiments of the present disclosure overcome technical challenges and difficulties in determining health levels associated with software services provided by the cloud-based software service system. Additional embodiments of the present disclosure include, but are not limited to, rendering various user interfaces that facilitate generating and editing various data objects described herein.

Definitions

As used herein, the terms "data," "content," "digital content," "digital content object," "information," and similar terms may be used interchangeably to refer to data capable of being transmitted, received, and/or stored in accordance with examples of the present disclosure. Thus, use of any such terms should not be taken to limit the spirit and scope of examples of the present disclosure. Further, where a computing device is described herein to receive data from another computing device, it will be appreciated that the data may be received directly from another computing device or may be received indirectly via one or more intermediary computing devices, such as, for example, one or more servers, relays, routers, network access points, base stations, hosts, and/or the like (sometimes referred to herein as a "network"). Similarly, where a computing device is described herein to send data to another computing device, it will be appreciated that the data may be sent directly to another computing device or may be sent indirectly via one or more intermediary computing devices, such as, for example, one or more servers, relays, routers, network access points, base stations, hosts, and/or the like.

In the present disclosure, the term "circuitry" should be understood broadly to include hardware and, in some examples, software for configuring the hardware. With respect to components of the apparatus, the term "circuitry" as used herein should therefore be understood to include particular hardware configured to perform the functions associated with the particular circuitry as described herein. For example, in some examples, "circuitry" may include processing circuitry, storage media, network interfaces, input/output devices, and the like.

In the present disclosure, the terms "set" or "subset" refer to a collection of zero or more elements.

In the present disclosure, the term "data object" refers to a data structure that represents data, information, functionalities and/or characteristics associated with data and/or information. In some embodiments, an example data object may comprise or be associated with a plurality of metadata. In the present disclosure, the term "metadata" refers to a parameter, a data field, a data element, or the like that describes an attribute of a data object.

In various embodiments of the present disclosure, examples of data objects may be associated with different data object types. Examples of data object types may include, but are not limited to, software service data objects, metric-based alert data objects, metric-based rule data objects, and service health status data objects, details of which are described herein.

In the present disclosure, the term "software service data object" refers to a type of data object that represents one or more features, attributes, functionalities and/or characteristics associated with and/or related to a software service. In some embodiments, software service data objects in an example cloud-based software service system may be associated with different types based on the corresponding software services that each software service data object represents and/or indicate.

For example, an example software service data object may represent and/or indicate features, attributes, functionalities and/or characteristics associated with a gateway service (also referred to as an "gateway software service data object" herein). In such an example, the gateway software service data object represents and/or indicates one or more features, attributes, and/or functionalities that are provided by the cloud-based software service system for enabling transformations, routing, delivering and common processing of data and/or information to, from, and/or across services in the cloud-based software service system.

As another example, an example software service data object may represent and/or indicate features, attributes, functionalities and/or characteristics associated with an identity service (also referred to as an "identity software service data object" herein). In such an example, the identity software service data object represents and/or indicates one or more features, attributes, and/or functionalities that are provided by the cloud-based software service system for authenticating the identities of users who access the cloud-based software service system, and providing the right access privileges of software applications, files, and other resources to the right users.

As another example, an example software service data object may represent and/or indicate features, attributes, functionalities and/or characteristics associated with an order service (also referred to as an "order software service data object" herein). In such an example, the order software service data object represents and/or indicates one or more features, attributes, and/or functionalities that are provided by the cloud-based software service system for allowing users of the cloud-based software service system to conduct one or more transactions between and/or among one another and/or to complete one or more orders.

As another example, an example software service data object may represent and/or indicate features, attributes, functionalities and/or characteristics associated with an inventory service (also referred to as an "inventory software service data object" herein). In such an example, the inventory software service data object represents and/or indicates one or more features, attributes, and/or functionalities that are provided by the cloud-based software service system for determining, calculating, tracking, and/or monitoring inventories for completing transactions and orders through the cloud-based software service system.

While the description above provides several example types of software service data objects, it is noted that the scope of the present disclosure is not limited to the description above. In some examples, an example cloud-based software service system may provide one or more additional and/or alternative types of software service data objects.

In the present disclosure, the term "metric-based alert data object" refers to a type of data object that defines, comprises, and/or represents metric-based data and/or information associated with a cloud-based software service system.

For example, the cloud-based software service system may be in data communications with one or more service system metric monitoring platforms, and the one or more service system metric monitoring platforms may generate metric-based alert data objects based on the monitored metrics of the cloud-based software service system. Examples of the service system metric monitoring platform may include, but not limited to, SignalFX, New Relic, and/or the like.

In some embodiments, the service system metric monitoring platform may monitor metrics associated with the cloud-based software service system across the infrastructure of the cloud-based software service system and over diverse software applications, servers, and/or sources of the cloud-based software service system. Example types of metrics monitored by the service system metric monitoring platform may include, but are not limited to, gauge metrics (which is data that has a specific value at each point in time), counter metrics (which represent a count of occurrences in a time interval), and/or the like.

For example, the service system metric monitoring platform may monitor gauge metrics of the cloud-based software service system that include, but not limited to, Central Processing Unit (CPU) utilization rates of one or more cloud-based software service servers, memory usage of one or more cloud-based software service servers, and/or the like. Additionally, or alternatively, the service system metric monitoring platform may monitor counter metrics of the cloud-based software service system that include, but not limited to, a number of requests handled by one or more cloud-based software service servers, a number of error messages encountered by the one or more cloud-based software service servers, and/or the like.

While the description above provides examples of metrics that are monitored by the service system metric monitoring platform, it is noted that the scope of the present disclosure is not limited to the description above. In some examples, an example service system metric monitoring platform may monitor one or more additional and/or alternative types of metrics of the cloud-based software service system.

In some embodiments, the service system metric monitoring platform may generate one or more metric-based alert data objects based on the one or more metrics of the cloud-based software service system that are monitored by the service system metric monitoring platform. For example, the service system metric monitoring platform may generate one or more metric-based alert data objects that list, indicate, summarize, and/or report one or more metrics of the cloud-based software service system.

In some embodiments, example metric-based alert data objects in accordance with some embodiments of the present disclosure may correspond to different types. Example types of the metric-based alert data objects may include, but are not limited to, system alert data objects, system metric data objects, and/or the like.

In the present disclosure, the term "system alert data object" refers to a data object that represents an alert or a notification associated with the cloud-based software service system that is generated based on one or more metrics associated with the cloud-based software service system.

In some embodiments, the service system metric monitoring platform may monitor metrics associated with the cloud-based software service system, and may generate one or more alerts and/or notifications based on the monitored metrics. For example, when the metrics monitored by the service system metric monitoring platform indicates an occurrence of an error message from a cloud-based software service server of the cloud-based software service system (for example, according to the counter metrics), the service system metric monitoring platform may generate the system alert data object that represents and/or indicates an alert or a notification of the error message from the cloud-based software service server. As an example, the system alert data object may indicate that an alert or a notification that a cloud-based software service server of the cloud-based software service system returns a 5XX error (e.g. when the cloud-based software service server cannot successfully complete a client's request).

While the description above provides an example of a system alert data object, it is noted that the scope of the present disclosure is not limited to the description above. In some examples, an example system alert data object may represent and/or indicate one or more additional and/or alternative alerts and/or notifications.

In the present disclosure, the term "system metric data object" refers to a data object that represents a metric associated with the cloud-based software service system. As described above, the service system metric monitoring platform may monitor metrics of the cloud-based software service system that include, but are not limited to, gauge metrics, counter metrics, and/or the like. In some embodiments, the service system metric monitoring platform may generate system metric data objects that indicate and/or represent the metrics that are monitored by the cloud-based software service system. For example, system metric data objects may represent or indicate data and/or information such as, but not limited to, CPU utilization rates of one or more cloud-based software service servers, memory usage of one or more cloud-based software service servers, a number of requests handled by one or more cloud-based software service servers, a number of error messages encountered by the one or more cloud-based software service servers, and/or the like.

As described above, an example data object in accordance with some embodiments of the present disclosure may comprise or be associated with a plurality of metadata. For example, an example metric-based alert data object may comprise metadata such as system-monitored metric metadata. In the present disclosure, the term "system-monitored metric metadata" refers to the metadata that is associated with the metric-based alert data object (for example, associated with the system alert data object or the system metric data object) and is generated by a service system metric monitoring platform.

In some embodiments, the system-monitored metric metadata may represent, comprise, and/or indicate data and/or information associated with the metric-based alert data object. For example, if the metric-based alert data object is in the form of a system alert data object, the system-monitored metric metadata may represent, comprise, and/or indicate the alert and/or the notification associated with the system alert data object as described above. If the metric-based alert data object is in the form of a system metric data object, the system-monitored metric metadata may represent, comprise, and/or indicate the metrics of the system metric data object as described above.

In some embodiments, the system-monitored metric metadata may be in the form of text string(s), numerical character(s), alphabetical character(s), alphanumeric code(s), American Standard Code for Information Interchange (ASCII) character(s), and/or the like.

In the present disclosure, the term "metric-based rule data object" refers to a data object that comprises, represents, and/or defines one or more rules and/or guidelines that establish correlations and/or mappings between metric-based alert data objects and corresponding software service data objects, and/or correlations and/or mappings between metric-based alert data objects and corresponding health levels of software services.

For example, the metric-based rule data object may represent, define, and/or comprise one or more rules that set forth one or more conditions associated with the metric-based alert data object. If the metric-based alert data object satisfies the one or more conditions of the one or more rules from the metric-based rule data object, the metric-based rule data object indicates one or more software service data objects that are associated with or correlate to the metric-based alert data object. Additionally, or alternatively, if the metric-based alert data object satisfies the one or more conditions of the one or more rules from the metric-based rule data object, the metric-based rule data object indicates one or more health levels of software services that correspond to the metric-based alert data object.

As described above, an example data object in accordance with some embodiments of the present disclosure may comprise or be associated with a plurality of metadata. For example, an example metric-based rule data object may comprise metadata such as user-defined mapping metadata. In the present disclosure, the term "user-defined mapping metadata" refers to metadata of a metric-based rule data object that is defined by a user (for example, a user of the cloud-based software service system) and may provide correlations and/or mappings between metric-based alert data objects received from service system metric monitoring platform and software service data objects of the cloud-based software service system, and/or correlations and/or mappings between metric-based alert data objects received from service system metric monitoring platform and one or more health levels of software services that are provided by the cloud-based software service system. In some embodiments, the user-defined mapping metadata may be in the form of text string(s), numerical character(s), alphabetical character(s), alphanumeric code(s), ASCII character(s), and/or the like.

In some embodiments, the user-defined mapping metadata comprises one or more indicators. For example, an example user-defined mapping metadata may comprise one or more metric-to-service mapping indicators and one or more metric-to-health mapping indicators.

In the present disclosure, the term "metric-to-service mapping indicator" refers to one or more parts of user-defined mapping metadata that define or indicate which software service data object or software service data objects that one or more metric-based alert data objects are associated with. In some embodiments, the metric-to-service mapping indicator comprises one or more software service identification criteria and one or more software service data object identifiers. In some embodiments, the metric-to-service mapping indicator provides and/or defines one or more data correlations and/or mapping between the software service identification criteria and the software service data object identifiers. In some embodiments, the metric-to-service mapping indicator may be in the form of text string(s), numerical character(s), alphabetical character(s), alphanumeric code(s), ASCII character(s), and/or the like.

In the present disclosure, the terms "software service identification criterion" or "software service identification criteria" refer to a criterion or criteria associated with one or more metric-based alert data objects for determining which software service data object(s) that the one or more metric-based alert data objects are associated with. For example, an example software service identification criterion may set forth one or more conditions, ranges, threshold, and/or the like associated with metric-based alert data objects (for example, associated with the system-monitored metric metadata of the metric-based alert data objects). In some embodiments, the software service identification criterion may be in the form of text string(s), numerical character(s), alphabetical character(s), alphanumeric code(s), ASCII character(s), and/or the like.

In the present disclosure, the term "software service data object identifier" refers to an identifier that uniquely identifies a software service data object associated with the cloud-based software service system. For example, each of the one or more software service data object identifiers associated with the metric-to-service mapping indicator is associated with one of the one or more software service data objects in the cloud-based software service system. In some embodiments, the software service data object identifier may be in the form of text string(s), numerical character(s), alphabetical character(s), alphanumeric code(s), ASCII character(s), and/or the like.

In some embodiments, each of the one or more software service identification criteria sets forth one or more conditions related to a metric-based alert data object, and the metric-to-service mapping indicator comprises correlations and/or mapping between each of the one or more software service identification criteria and at least one of the one or more software service data object identifiers. As such, each of the one or more software service identification criteria of an example metric-to-service mapping indicator corresponds to one of the one or more software service data object identifiers of the metric-to-service mapping indicator. If an example metric-based alert data object satisfies the one or more criteria or conditions set forth in a software service identification criterion, the metric-to-service mapping indicator may indicate a corresponding software service data object identifier through the correlations and/or mapping of the metric-to-service mapping indicator, details of which are described herein.

In the present disclosure, the term "metric-to-health mapping indicator" refers to one or more parts of user-defined mapping metadata that define what health level or health levels of software services that one or more metric-based alert data objects indicate. In some embodiments, the metric-to-health mapping indicator comprises one or more software service health criteria and one or more software service health level identifiers. In some embodiments, the metric-to-health mapping indicator provides and/or defines one or more data correlations and/or mapping between the software service health criteria and the software service health level identifiers. In some embodiments, the metric-to-health mapping indicator may be in the form of text string(s), numerical character(s), alphabetical character(s), alphanumeric code(s), ASCII character(s), and/or the like.

In the present disclosure, the terms "software service health criterion" or "software service health criteria" refer to a criterion or criteria associated with one or more metric-based alert data objects for determining health level(s) associated with software service data object(s) or software service(s). For example, an example software service health criterion may set forth one or more conditions, ranges, threshold, and/or the like associated with metric-based alert data objects (for example, associated with the system-monitored metric metadata of the metric-based alert data objects). In some embodiments, the software service health criterion may be in the form of text string(s), numerical character(s), alphabetical character(s), alphanumeric code(s), ASCII character(s), and/or the like.

In the present disclosure, the term "software service health level identifier" refers to an identifier that uniquely identifies a health level of a software service. For example, each of the one or more software service health level identifiers of an example metric-to-health mapping indicator indicates a corresponding software service health level. In some embodiments, the software service health level identifier may be in the form of text string(s), numerical character(s), alphabetical character(s), alphanumeric code(s), ASCII character(s), and/or the like.

In the present disclosure, a "software service health level" associated with a software service or a software service data object refers to a degree or an extent to which the cloud-based software service system can reliably, successfully, and/or quickly carry out or provide the software service of the cloud-based software service system, similar to those described above.

In some embodiments, an example software service health level may be in the form of a numerical value. For example, the example software service health level may be in the form of a percentage. The higher the percentage indicated by the software service health level, the healthier the software service (for example, the cloud-based software service system can more reliably, successfully, and/or quickly provide the software service). The lower the percentage indicated by the software service health level, the less healthy the software service.

Additionally, or alternatively, an example software service health level may be in the form of a binary value. For example, the example software service health level may indicate that an example software service is either "healthy" or "unhealthy." In the present disclosure, the term "healthy status" refers to a status of a software service in which the cloud-based software service system can reliably, successfully, and/or quickly provide the software service. The term "unhealthy status" refers to a status of a software service in which the cloud-based software service system cannot reliably, successfully, and/or quickly provide the software service.

In some embodiments, each of the one or more software service health criteria sets forth one or more criteria or conditions related to a metric-based alert data object, and the metric-to-health mapping indicator comprises correlations and/or mapping between each of the one or more software service health criteria and at least one of the one or more software service health level identifiers. As such, each of the one or more software service health criteria of an example metric-to-health mapping indicator corresponds to one of the one or more software service health level identifiers. If an example metric-based alert data object satisfies the one or more criteria or conditions set forth in a software service health criterion, the metric-to-health mapping indicator may indicate a corresponding software service health level identifier through the correlations and/or mapping of the metric-to-health mapping indicator, details of which are described herein.

In the present disclosure, the term "service health status data object" refers to a type of data object that is uniquely associated with a software service data object of the cloud-based software service system and indicates a software service health level associated with that software service data object. In some embodiments, an example service health status data object may be generated by a service health status monitoring server or a service health status monitoring platform based at least in part on the system-monitored metric metadata and the user-defined mapping metadata, details of which are described herein.

As described above, an example data object in accordance with some embodiments of the present disclosure may comprise or be associated with a plurality of metadata. For example, an example service health status data object may comprise metadata such as service health status metadata. In the present disclosure, the term "service health status metadata" refers to metadata of a service health status data object that identifies one or more software service data objects (or software services) associated with the cloud-based software service system and indicates one or more software service health levels of the one or more software service data objects (or software services). In some embodiments, the service health status metadata may be in the form of text string(s), numerical character(s), alphabetical character(s), alphanumeric code(s), ASCII character(s), and/or the like.

In the present disclosure, the term "service dependency data object" refers to a type of data object that represents features, attributes, functionalities and/or characteristics associated dependencies between and among software service data objects associated with the cloud-based software service system, which correspond to dependencies between and among software services provided by the cloud-based software service system. In the present disclosure, the "dependency" refers to a state of reliance by a first software service data object (or a first software service) on a second software service data object (or a second software service) for the first software service data object (or the first software service) to provide or enable one or more of its functionalities. In some embodiments, a first software service data object that relies on a dependency to a second software service data object (e.g., the second system service is a dependency of the first system service) indicates that the second software service data object must be functioning at least in part for the first software service data object to provide one or more of its functionalities that rely on the second software service data object (for example, the second software service must provide output to the first software service). In some embodiments, a first software service data object that is "dependent on" a second software service data object has a dependency to the second software service data object.

As described above, an example data object in accordance with some embodiments of the present disclosure may comprise or be associated with a plurality of metadata. For example, an example service dependency data object may comprise metadata such as service dependency metadata that are associated with the one or more software service data objects. In the present disclosure, the term "service dependency metadata" refers to metadata of a service dependency data object that describes, indicates, and/or represents related software service data objects associated with one or more software service data objects of the cloud-based software service system. For example, the service dependency metadata may comprise software service data object identifiers associated with the related software service data objects. In some embodiments, the service dependency metadata may be in the form of text string(s), numerical character(s), alphabetical character(s), alphanumeric code(s), ASCII character(s), and/or the like.

In some embodiments, when a first software service data object depends on a second software service data object, the second software service data object is a parent software service data object to the first software service data object, and the first software service data object is a child software service data object of the second software service data object. In the present disclosure, a "related software service data object" of a first software service data object refers to a software service data object that is related to the first software service data object based on the service dependency metadata of the service dependency data object. For example, the related software service data object of the first software service data object may be a child software service data object of the first software service data object, a grandchild software service data object of the first software service data object, a great grandchild software service data object of the first software service data object, and/or the like. Additionally, or alternatively, the related software service data object of the first software service data object may be a parent software service data object of the first software service data object, a grandparent software service data object of the first software service data object, a great grandparent software service data object of the first software service data object, and/or the like.

In the present disclosure, the term "related software service health level" refers to a software service health level associated with a related software service data object.

In the present disclosure, the term "health status monitoring user interface" refers to a human-computer interface that is rendered for display on a client device and displays data and/or information related to the health levels of the software services in the cloud-based software service system, details of which are described herein.

In some embodiments, an example user interface may comprise one or more user interface objects. In the present disclosure, the term "user interface object" refers to a user interface element that is rendered as a part of a user interface. For example, the term "service health status user interface object" refers to a user interface object that is rendered on a health status monitoring user interface and generated based on a service health status data object, details of which are described herein.

In the present disclosure, the term "incident data object" refers to a type of data object that comprises, represents, and/or is associated with data and/or information associated with an incident in a cloud-based software service system. In some embodiments, the term "incident" refers to a performance issue associated with the cloud-based software service system (for example, associated with one or more services). Examples of incidents in a cloud-based software service system may include, but are not limited to, network service interruptions, service downtimes, server malfunctions, and/or the like. In some embodiments, an incident may be detected based on (and an incident data object may be generated based on) one or more service health status data objects associated with the software service data objects of the cloud-based software service system, details of which are described herein.

Example System Architecture for Implementing Embodiments of the Present Disclosure Methods, apparatuses, and computer program products of the present disclosure may be embodied by any of a variety of devices. For example, the method, apparatus, and computer program product of an example embodiment may be embodied by a networked device (e.g., an cloud-based software service server and/or a client device) configured to communicate with one or more devices. Additionally, or alternatively, the computing device may include fixed computing devices, such as a personal computer or a computer workstation. Still further, example embodiments may be embodied by any of a variety of mobile devices, such as a portable digital assistant (PDA), mobile telephone, smartphone, laptop computer, tablet computer, wearable, or any combination of the aforementioned devices.

Methods, apparatuses, and computer program products of the present disclosure may be embodied by any of a variety of devices. For example, the method, apparatus, and computer program product of an example embodiment may be embodied by a networked device (e.g., a cloud-based software service server and/or a client device) configured to communicate with one or more devices. Additionally, or alternatively, the computing device may include fixed computing devices, such as a personal computer or a computer workstation. Still further, example embodiments may be embodied by any of a variety of mobile devices, such as a portable digital assistant (PDA), mobile telephone, smartphone, laptop computer, tablet computer, wearable (such as a smart watch), or any combination of the aforementioned devices.

FIG. 1 illustrates an example cloud-based software service infrastructure 100 within which embodiments of the present disclosure may operate. In the example shown in FIG. 1, the cloud-based software service infrastructure 100 may comprise a cloud-based software service system 111.

As described above, a cloud-based software service system 111 may comprise a plurality of cloud-based software service servers that perform data services and/or data exchanges among cloud-based software service servers. In the example shown in FIG. 1, the cloud-based software service system 111 comprises a plurality of cloud-based software service servers, such as, but not limited to, the cloud-based software service server 113A, the cloud-based software service server 113B, the cloud-based software service server 113C, the cloud-based software service server 113D, the cloud-based software service server 113E, the cloud-based software service server 113F, . . . , and/or the cloud-based software service server 113N.

In some embodiments, each of the cloud-based software service server 113A, the cloud-based software service server 113B, the cloud-based software service server 113C, the cloud-based software service server 113D, the cloud-based software service server 113E, the cloud-based software service server 113F, . . . , and/or the cloud-based software service server 113N may host one or more cloud software applications, and may executed the hosted cloud software applications to perform or carry out one or more software services. For example, one or more of the plurality of cloud-based software service servers 113A-113N are in electronic communication with one or more other cloud-based software service servers 113A-113N as shown in FIG. 1. The electronic communications between and among the cloud-based software service servers 113A-113N allow one or more of the cloud-based software service servers 113A-113N to exchange data and/or information with one another, so as to provide software services such as, but not limited to, gateway services, identity service, order service, inventory service, and/or the like.

While the description above provides an example illustration of a cloud-based software service system, it is noted that the scope of the present disclosure is not limited to the description above. In some examples, the number of cloud-based software service servers in an example cloud-based software service system may be more or less than those shown in FIG. 1. In some examples, an example cloud-based software service system may comprise one or more additional and/or alternative elements.

In some embodiments, the example cloud-based software service infrastructure 100 comprises a service system metric monitoring platform 117. In some embodiments, the service system metric monitoring platform 117 comprises one or more the service system metric monitoring servers, such as, but not limited to, the service system metric monitoring server 115.

In some embodiments, the service system metric monitoring platform 117 is in data communications with the cloud-based software service system 111. For example, as described above, the service system metric monitoring platform 117 monitor metrics associated with the cloud-based software service system 111. For example, the service system metric monitoring platform 117 may monitor gauge metrics of the cloud-based software service system 111 that include, but are not limited to, CPU utilization rates of one or more of the plurality of cloud-based software service servers 113A-113N, memory usage of one or more of the plurality of cloud-based software service servers 113A-113N, and/or the like. Additionally, or alternatively, the service system metric monitoring platform 117 may monitor counter metrics of the cloud-based software service system that include, but not limited to, a number of requests handled by one or more of the plurality of cloud-based software service servers 113A-113N, a number of error messages encountered by one or more of the plurality of cloud-based software service servers 113A-113N, and/or the like.

In some embodiments, the service system metric monitoring platform 117 may generate metric-based alert data objects based on the one or more metrics of the cloud-based software service system 111 that are monitored by the service system metric monitoring platform 117.

For example, the service system metric monitoring platform 117 may generate one or more system alert data objects. As described above, the system alert data objects may represent an alert or a notification associated with the cloud-based software service system 111. For example, the system alert data objects generated by the service system metric monitoring platform 117 may represent an alert or a notification associated with one or more of the plurality of cloud-based software service servers 113A-113N. As an example, a system alert data object generated by the service system metric monitoring platform 117 may indicate that the cloud-based software service server 113A returns an error message.

Additionally, or alternatively, the service system metric monitoring platform 117 may generate one or more system metric data objects. As described above, the system metric data object may represent metrics of the cloud-based software service system 111 that include, but are not limited to, gauge metrics, counter metrics, and/or the like. For example, the system metric data objects may represent or indicate data and/or information such as, but not limited to, CPU utilization rates of one or more of the plurality of cloud-based software service servers 113A-113N, memory usage of one or more of the plurality of cloud-based software service servers 113A-113N, a number of requests handled by one or more of the plurality of cloud-based software service servers 113A-113N, a number of error messages encountered by the one or more of the plurality of cloud-based software service servers 113A-113N, and/or the like.

In some embodiments, the example cloud-based software service infrastructure 100 comprises a service health status monitoring system 109. For example, the service health status monitoring system 109 may comprise a service health status monitoring server 107. In some embodiments, the service health status monitoring server 107 may receive the metric-based alert data objects associated with the cloud-based software service system 111 from the service system metric monitoring platform 117.

In some embodiments, the service health status monitoring server 107 is in electronic communication with the cloud-based software service system 111. For example, the service health status monitoring server 107 may generate one or more software service data objects that are associated with the cloud-based software service system 111. As described above, software service data objects are data objects that represent features, attributes, functionalities and/or characteristics associated with and/or related to software services provided by the cloud-based software service system 111. For example, the cloud-based software service system 111 may provide gateway service, identity service, order service, and inventory service. In some embodiments, the service health status monitoring server 107 may generate one or more software service data objects for the gateway service, one or more software service data objects for the identity service, one or more software service data objects for the order services, and/or one or more software service data objects for the inventory service.

In some embodiments, the service health status monitoring system 109 may comprise a service health status monitoring data repository 105. In some embodiments, the service health status monitoring server 107 of the service health status monitoring system 109 is in data communications with the service health status monitoring data repository 105. For example, the service health status monitoring server 107 may store the one or more software service data objects to the service health status monitoring data repository 105.

In some embodiments, the service health status monitoring server 107 is in electronic communication with one or more client devices (such as, but not limited to, client devices 101A, 101B, . . . 101N) via a communication network 103.

In some embodiments, the communication network 103 may include any wired or wireless communication network including, for example, a wired or wireless local area network (LAN), personal area network (PAN), metropolitan area network (MAN), wide area network (WAN), or the like, as well as any hardware, software and/or firmware required to implement it (such as, e.g., network routers, etc.). For example, the communication network 103 may include an 802.11, 802.16, 802.20, and/or WiMax network. Further, the communication network 103 may include a public network (such as the Internet), a private network (such as an intranet), or combinations thereof, and may utilize a variety of networking protocols including, but not limited to, TCP/IP based networking protocols. For instance, the networking protocol may be customized to suit the needs of the service health status monitoring system 109 and/or the client devices 101A-101N. In some embodiments, the protocol is a custom protocol of JSON objects sent via a WebSocket channel. In some embodiments, the protocol is JSON over RPC, JSON over REST/HTTP, and the like.

In some embodiments, the client devices 101A-101N may be a computing device as described herein, including, but not limited to, desktop computers, laptop computers, smartphones, netbooks, tablet computers, wearables, and the like. In some embodiments, the client devices 101A-101N may interact with the service health status monitoring system 109 via a web browser or through a web application that runs in a web browser. As yet another example, the client devices 101A-101N may include various hardware or firmware designed to interface with the service health status monitoring system 109.

In various embodiments of the present disclosure, electronic data received by the service health status monitoring system 109 from the client devices 101A-101N may be provided in various forms and via various methods. For example, data and information (such as but not limited to, data objects) may be sent to the service health status monitoring system 109 via, for example, the communication network directly by a client device of client devices 101A-101N. Additionally, or alternatively, these data and information (such as but not limited to, data objects) may be sent to the service health status monitoring system 109 via one or more intermediaries.

In some embodiments, one or more of the client devices 101A-101N may generate and transmit metric-based rule data objects to the service health status monitoring system 109. As described above, the metric-based rule data objects may comprise, represent, and/or define one or more rules and/or guidelines that establish correlations and/or mappings between metric-based alert data objects received from the service system metric monitoring platform 117 and corresponding software service data objects/software services associated with the cloud-based software service system 111, and/or correlations and/or mappings between metric-based alert data objects received from the service system metric monitoring platform 117 and corresponding health levels of software services provided by the cloud-based software service system 111.

For example, one or more of the client devices 101A-101N may render metric-based rule data object creation user interfaces on displays of the one or more of the client devices 101A-101N. In some embodiments, through the metric-based rule data object creation user interfaces, users of one or more of the client devices 101A-101N may provide user inputs that can be used to create metric-based rule data objects.

In some embodiments, the user inputs may define or indicate, for example but not limited to, one or more software service identification criteria and one or more software service data object identifiers. For example, the user inputs may specify the criterion or criteria associated with one or more metric-based alert data objects, and may identify one or more software service data objects associated with the cloud-based software service system 111. In some embodiments, through the metric-based rule data object creation user interfaces, the user inputs may indicate correlation and/or mapping between the one or more software service data object and the criterion or criteria associated with one or more metric-based alert data objects. In some embodiments, the one or more of the client devices 101A-101N may generate metric-to-service mapping indicators based on the user inputs. In such examples, the metric-to-service mapping indicators may indicate that, if a metric-based alert data object satisfies the criterion or criteria as specified by the user inputs, the metric-based alert data object is associated with a software service data object that is identified by the user inputs.

Additionally, or alternatively, the user inputs may define or indicate, for example but not limited to, one or more software service health criteria and one or more software service health level identifiers. For example, the user inputs may specify the criterion or criteria associated with one or more metric-based alert data objects, and may identify software service health levels. In some embodiments, through the metric-based rule data object creation user interfaces, the user inputs may indicate correlation and/or mapping between the software service health level identifiers and the criterion or criteria associated with one or more metric-based alert data objects. In some embodiments, the one or more of the client devices 101A-101N may generate metric-to-health mapping indicators based on the user inputs. In such examples, the metric-to-health mapping indicators may indicate that, if a metric-based alert data object satisfies the criterion or criteria as specified by the user inputs, the metric-based alert data object indicates a software service health level that is identified by the user inputs.

In some embodiments, the one or more of the client devices 101A-101N may generate user-defined mapping metadata based at least in part on one or more metric-to-service mapping indicators and/or one or more metric-to-health mapping indicators. In some embodiments, based at least in part on the user-defined mapping metadata, the one or more of the client devices 101A-101N may generate one or more metric-based rule data objects, and may transmit the one or more metric-based rule data objects to the service health status monitoring system 109.

In some embodiments, after the service health status monitoring system 109 receives one or more metric-based rule data objects from one of the client devices 101A, 101B, . . . , 101N, the service health status monitoring server 107 may store the one or more metric-based rule data objects in the service health status monitoring data repository 105. Subsequently, the service health status monitoring server 107 may retrieve the one or more metric-based rule data objects from the service health status monitoring data repository 105, and may generate one or more service health status data objects associated with the software services of the cloud-based software service system 111 based at least in part on the metric-based rule data objects, as well as the metric-based alert data objects from the service system metric monitoring platform 117, details of which are described herein.

In some embodiments, the service health status monitoring system 109 may further cause rendering a health status monitoring user interface on one or more of the client devices 101A, 101B, . . . , 101N. For example, the service health status monitoring system 109 may generate one or more service health status user interface objects corresponding to one or more software service data objects associated with the cloud-based software service system 111 based at least in part on one or more service health status data objects generated by the service health status monitoring server 107, details of which are described herein.

It is noted that various components of the cloud-based software service infrastructure 100 may leverage the same computer or computing apparatus to perform various operations. For example, various components of the cloud-based software service servers 113A-113N in the cloud-based software service system 111, the service system metric monitoring server 115 in the service system metric monitoring platform 117, and the service health status monitoring server 107 in the service health status monitoring system 109 may leverage the same computer or computing apparatus to perform various operations, such that separate circuitries and/or computing entities are not needed.

Example Apparatuses for Implementing Embodiments of the Present Disclosure

The client devices 101A, 101B, . . . , 101N of FIG. 1 may include one or more computing systems, such as the apparatus 200 shown in FIG. 2. The apparatus 200 may be configured to execute at least some of the operations described above with respect to FIG. 1 and below with respect to FIG. 4 to FIG. 9 and/or render at least some of the user interfaces described below with respect to FIG. 10 to FIG. 14. The apparatus 200 may include a processor 206, a memory 202, an input/output circuitry 208, a communications circuitry 210, and/or a display 204. The apparatus 200 may be configured to execute the operations described herein. Although the components are described with respect to functional limitations, it should be understood that the particular implementations necessarily include the use of particular hardware. It should also be understood that certain of the components described herein may include similar or common hardware. For example, two sets of circuitries may both leverage use of the same processor, network interface, storage medium, or the like to perform their associated functions, such that duplicate hardware is not required for each set of circuitries. The use of the term "circuitry" as used herein with respect to components of the apparatus should therefore be understood to include particular hardware configured to perform the functions associated with the particular circuitry as described herein.

In some embodiments, the processor 206 (and/or co-processor or any other processing circuitry assisting or otherwise associated with the processor) may be in communication with the memory 202 via a bus for passing information among components of the apparatus. The memory 202 may be non-transitory and may include, for example, one or more volatile and/or non-volatile memories. In other words, for example, the memory 202 may be an electronic storage device (e.g., a computer readable storage medium). The memory 202 may be configured to store information, data, content, applications, instructions, or the like, for enabling the apparatus 200 to carry out various functions in accordance with example embodiments of the present disclosure.

The processor 206 may be embodied in a number of different ways and may, for example, include one or more processing devices configured to perform independently. Additionally, or alternatively, the processor 206 may include one or more processors configured in tandem via a bus to enable independent execution of instructions, pipelining, and/or multithreading. The use of the term "processing circuitry" may be understood to include a single core processor, a multi-core processor, multiple processors internal to the apparatus, and/or remote or "cloud" processors.

In an example embodiment, the processor 206 may be configured to execute instructions stored in the memory 202 or otherwise accessible to the processor. Alternatively, or additionally, the processor 206 may be configured to execute hard-coded functionality. As such, whether configured by hardware or software methods, or by a combination thereof, the processor may represent an entity (e.g., physically embodied in circuitry) capable of performing operations according to an embodiment of the present disclosure while configured accordingly. Alternatively, as another example, when the processor 206 is embodied as an executor of software instructions, the instructions may specifically configure the processor to perform the algorithms and/or operations described herein when the instructions are executed.

In some embodiments, the apparatus 200 may include the input/output circuitry 208 that may, in turn, be in communication with the processor 206 to provide output to the user and, in some embodiments, to receive an indication of a user input. The input/output circuitry 208 may comprise a user interface circuitry and may include a display, which may comprise a web user interface, a mobile application, a client device, a kiosk, or the like. In some embodiments, the input/output circuitry 208 may also include a keyboard, a mouse, a joystick, a touch screen, touch areas, soft keys, a microphone, a speaker, or other input/output mechanisms. The processor and/or user interface circuitry comprising the processor may be configured to control one or more functions of one or more user interface elements through computer program instructions (e.g., software and/or firmware) stored on a memory accessible to the processor (e.g., the memory 202, and/or the like).

In some embodiments, the apparatus 200 may include the display 204 that may, in turn, be in communication with the processor 206 to display renderings of card data object rendering interfaces. In various examples of the present disclosure, the display 204 may include a liquid crystal display (LCD), a light-emitting diode (LED) display, a plasma (PDP) display, a quantum dot (QLED) display, and/or the like.

The communications circuitry 210 may be any means such as a device or circuitry embodied in either hardware or a combination of hardware and software that is configured to receive and/or transmit data from/to a network and/or any other device, circuitry, or module in communication with the apparatus 200. In this regard, the communications circuitry 210 may include, for example, a network interface for enabling communications with a wired or wireless communication network. For example, the communications circuitry 210 may include one or more network interface cards, antennae, buses, switches, routers, modems, and supporting hardware and/or software, or any other device suitable for enabling communications via a network. Additionally, or alternatively, the communication interface may include the circuitry for interacting with the antenna(s) to cause transmission of signals via the antenna(s) or to handle receipt of signals received via the antenna(s).

The service health status monitoring server 107 of FIG. 1 may be embodied by one or more computing systems, such as apparatus 300 shown in FIG. 3. The apparatus 300 may include a processor 305, a memory 301, an input/output circuitry 307, and a communications circuitry 303. The apparatus 300 may be configured to execute at least some of the operations described above with respect to FIG. 1 and below with respect to FIG. 4 to FIG. 9 and/or render at least some of the user interfaces described below with respect to FIG. 10 to FIG. 14. Although these components 301, 303, 305, and 307 are described with respect to functional limitations, it should be understood that the particular implementations necessarily include the use of particular hardware. It should also be understood that certain of these components 301, 303, 305, and 307 may include similar or common hardware. For example, two sets of circuitries may both leverage use of the same processor, network interface, storage medium, or the like to perform their associated functions, such that duplicate hardware is not required for each set of circuitries.

In some embodiments, the processor 305 (and/or co-processor or any other processing circuitry assisting or otherwise associated with the processor) may be in communication with the memory 301 via a bus for passing information among components of the apparatus. The memory 301 is non-transitory and may include, for example, one or more volatile and/or non-volatile memories. In other words, for example, the memory 301 may be an electronic storage device (e.g., a computer-readable storage medium). The memory 301 may be configured to store information, data, content, applications, instructions, or the like for enabling the apparatus to carry out various functions in accordance with example embodiments of the present disclosure.

The processor 305 may be embodied in a number of different ways and may, for example, include one or more processing devices configured to perform independently. In some examples, the processor 305 may include one or more processors configured in tandem via a bus to enable independent execution of instructions, pipelining, and/or multithreading. The use of the term "processor" or "processing circuitry" may be understood to include a single core processor, a multi-core processor, multiple processors internal to the apparatus, and/or remote or "cloud" processors.

In some examples, the processor 305 may be configured to execute instructions stored in the memory 301 or otherwise accessible to the processor 305. In some examples, the processor 305 may be configured to execute hard-coded functionalities. As such, whether configured by hardware or software methods, or by a combination thereof, the processor 305 may represent an entity (e.g., physically embodied in circuitry) capable of performing operations according to an embodiment of the present disclosure while configured accordingly. Alternatively, as another example, when the processor 305 is embodied as an executor of software instructions, the instructions may specifically configure the processor 305 to perform the algorithms and/or operations described herein when the instructions are executed.

In some embodiments, the apparatus 300 may include the input/output circuitry 307 that may, in turn, be in communication with the processor 305 to provide output to the user and, in some embodiments, to receive an indication of a user input. The input/output circuitry 307 may comprise a user interface circuitry and may include a display, which may comprise a web user interface, a mobile application, a client device, a kiosk, or the like. In some embodiments, the input/output circuitry 307 may also include a keyboard, a mouse, a joystick, a touch screen, touch areas, soft keys, a microphone, a speaker, or other input/output mechanisms. The processor and/or user interface circuitry comprising the processor may be configured to control one or more functions of one or more user interface elements through computer program instructions (e.g., software and/or firmware) stored on a memory accessible to the processor (e.g., the memory 301, and/or the like).

The communications circuitry 303 may be any means such as a device or circuitry embodied in either hardware or a combination of hardware and software that is configured to receive and/or transmit data from/to a network and/or any other device, circuitry, or module in communication with the apparatus 300. In this regard, the communications circuitry 303 may include, for example, a network interface for enabling communications with a wired or wireless communication network (such as the communication network described above in connection with FIG. 1). For example, the communications circuitry 303 may include one or more network interface cards, antennae, buses, switches, routers, modems, and supporting hardware and/or software, or any other device suitable for enabling communications via a network. Additionally, or alternatively, the communications circuitry 303 may include the circuitry for interacting with the antenna/antennae to cause transmission of signals via the antenna/antennae or to handle receipt of signals received via the antenna/antennae.

It is also noted that all or some of the information discussed herein can be based on data that is received, generated and/or maintained by one or more components of apparatus 300. In some embodiments, one or more external systems (such as a remote cloud computing and/or data storage system) may also be leveraged to provide at least some of the functionality discussed herein.

In some embodiments, other elements of the apparatus 300 may provide or supplement the functionality of particular circuitry. For example, the processor 305 may provide processing functionality, the memory 301 may provide storage functionality, the communications circuitry 303 may provide network interface functionality, and the like. As will be appreciated, any such computer program instructions and/or other type of code may be loaded onto a computer, processor or other programmable apparatus's circuitries to produce a machine, such that the computer, processor or other programmable circuitry that execute the code on the machine creates the means for implementing various functions, including those described herein.

Example Methods for Implementing Embodiments of the Present Disclosure

Various example methods described herein, including, for example, those as shown in FIG. 4 to FIG. 9, provide various technical advantages and/or improvements described above.

It is noted that each block of the flow chart, and combinations of blocks in the flow chart, may be implemented by various means such as hardware, firmware, circuitry and/or other devices associated with execution of software including one or more computer program instructions. For example, one or more of the methods described in FIG. 4 to FIG. 9 may be embodied by computer program instructions, which may be stored by a non-transitory memory of an apparatus employing an embodiment of the present disclosure and executed by a processor in the apparatus. These computer program instructions may direct a computer or other programmable apparatus to function in a particular manner, such that the instructions stored in the computer-readable storage memory produce an article of manufacture, the execution of which implements the function specified in the flow chart block(s).

As described above and as will be appreciated based on this disclosure, embodiments of the present disclosure may be configured as methods, mobile devices, backend network devices, and the like. Accordingly, embodiments may comprise various means including entirely of hardware or any combination of software and hardware. Furthermore, embodiments may take the form of a computer program product on at least one non-transitory computer-readable storage medium having computer-readable program instructions (e.g., computer software) embodied in the storage medium. Similarly, embodiments may take the form of a computer program code stored on at least one non-transitory computer-readable storage medium. Any suitable computer-readable storage medium may be utilized including non-transitory hard disks, CD-ROMs, flash memory, optical storage devices, or magnetic storage devices.

Referring now to FIG. 4, an example data flow diagram 400 in accordance with various embodiments of the present disclosure are illustrated, In particular, the example diagram 400 illustrates example data flows between and/or among a cloud-based software service system 402, a service system metric monitoring platform 406, and a service health status monitoring system 408.

In some embodiments, the cloud-based software service system 402 may provide one or more software services. In the example shown in FIG. 4, the cloud-based software service system 402 may provide software service 410A, software service 410B, software service 410C, and software service 410D. For example, the software service 410A may be a getaway service. Additionally, or alternatively, the software service 410B may be an identity service. Additionally, or alternatively, the software service 410C may be an order service. Additionally, or alternatively, the software service 410D may be an inventory service.

As described above, the cloud-based software service system 402 may be associated with a plurality of software service data objects. Each of the software service data objects may represent one or more features, attributes, functionalities and/or characteristics associated with and/or related to a software service. Continuing from the example above, features, attributes, functionalities and/or characteristics associated with and/or related to the software service 410A (a getaway service) may be represented by the getaway software service data object C1, the getaway software service data object C2, and the getaway software service data object C3. Features, attributes, functionalities and/or characteristics associated with and/or related to the software service 410B (an identity service) may be represented by the identity software service data object C1 and the identity software service data object C2. Features, attributes, functionalities and/or characteristics associated with and/or related to the software service 410C (an order service) may be represented by the order software service data object C1 and the order software service data object C2. Features, attributes, functionalities and/or characteristics associated with and/or related to the software service 410D (an inventory service) may be represented by the inventory software service data object C1, the inventory software service data object C2, and the inventory software service data object C3.

As described above, one or more software service data objects may be dependent upon one or more other software service data objects. In the example shown in FIG. 4, the getaway software service data object C3 is a parent software service data object of the getaway software service data object C2, as functionalities of the gateway service represented by the getaway software service data object C2 relied on one or more functionalities of the gateway service represented by the getaway software service data object C3. Similarly, the getaway software service data object C1 and the getaway software service data object C2 are parent software service data objects of the identity software service data object C1. The identity software service data object C1 and the identity software service data object C2 are parent software service data objects of the order software service data object C2. The identity software service data object C1 is a parent software service data object of the order software service data object C1. The order software service data object C1 is a parent software service data object of the inventory software service data object C2 and the inventory software service data object C3. The order software service data object C2 is a parent software service data object of the inventory software service data object C1.

In some embodiments, the dependencies of the software service data objects associated with the cloud-based software service system 402 (e.g. the dependencies of the software services provided by the cloud-based software service system 402) may be represented or indicated by one or more service dependency data objects. For example, the one or more service dependency data objects may comprise service dependency metadata that describes, indicates, and/or represents related software service data objects associated with one or more software service data objects of the cloud-based software service system.

In some embodiments, the service system metric monitoring platform 406 may generate metric-based alert data objects 412 based on the one or more metrics associated with the cloud-based software service system 402 and monitored by the service system metric monitoring platform 406. For example, the metric-based alert data objects 412 generated by the service system metric monitoring platform 406 may comprise one or more system alert data objects and/or one or more system metric data objects. In some embodiments, the service system metric monitoring platform 406 may provide the metric-based alert data objects 412 to the service health status monitoring system 408.

Similar to those described above in connection with at least FIG. 1, the service health status monitoring system 408 may comprise a service health status monitoring server. In some embodiments, the service health status monitoring server may host service health status monitoring software that, when executed by the service health status monitoring server, provides a service health status monitoring engine 414. In some embodiments, the service health status monitoring engine 414 comprises software algorithms and/or associated hardware that programmatically generate service health status data objects.

For example, the service health status monitoring engine 414 may receive the metric-based alert data object 412 from the service system metric monitoring platform 406 as one type of input to the service health status monitoring engine 414. Additionally, the service health status monitoring engine 414 may receive metric-based rule data objects 416 as another type of input to the service health status monitoring engine 414. Similar to those described above, the metric-based rule data objects 416 may be generated by one or more client devices based on user inputs. In particular, the metric-based rule data objects 416 may comprise user-defined mapping metadata that provide one or more rules and/or guidelines that establish correlations and/or mappings between the metric-based alert data objects 412 and corresponding software service data objects associated with the cloud-based software service system 402, and/or correlations and/or mappings between metric-based alert data objects 412 and corresponding health levels of software services provided by the cloud-based software service system 402.

In some embodiments, based on the metric-based alert data object 412 and the metric-based rule data objects 416, the service health status monitoring engine 414 may generate a service health status data object. For example, the service health status data object may indicate a service health level associated with the order software service data object C1 that is associated with the software service 410C of the cloud-based software service system 402, details of which are described herein.

As described above, a software service data object of the cloud-based software service system 402 may be associated with one or more related software service data objects as defined by the service dependency data object. For example, the order software service data object C1 of the cloud-based software service system 402 may be associated with an identity software service data object C1 that is a parent software service data object of the order software service data object C1, gateway software service data objects C1 and C2 that are grandparent software service data objects of the order software service data object C1, and the gateway software service data object C3 that is a great grandparent software service data object of the order software service data object C1. Additionally, the order software service data object C1 of the cloud-based software service system 402 may be associated with inventory software service data objects C2 and C3 that are child software service data objects of the order software service data object C1.

In some embodiments, subsequent to determining the health level of a software service data object, the service health status monitoring engine 414 may analyze the service dependency data object, and may determine one or more software service data objects that are related to the software service data object. The service health status monitoring engine 414 may determine and/or adjust the health levels of the related software service data objects.

In the example shown in FIG. 4, the service health status monitoring engine 414 may analyze the service dependency data object. Based on the service dependency data object, the service health status monitoring engine 414 determines that the identity software service data object C1 that is associated with the identity service 410B', the gateway software service data objects C1, C2, and C3 that are associated with the gateway service 410A', and the inventory software service data objects C2 and C3 that are associated with the inventory service 410D' are related software service data objects of the order software service data object C1 that is associated with the order service 410C'. In some embodiments, based at least in part on the service health status data object associated with the order software service data object C1, the service health status monitoring engine 414 may determine and/or adjust the related health levels as indicated by the related service health status data objects of the identity software service data object C1, the gateway software service data objects C1, C2, and C3 and the inventory software service data objects C2 and C3, and vice versa.

For example, if the service health status monitoring engine 414 determines that the service health status data objects of the identity software service data object C1 indicates that the identity software service data object C1 is associated with an unhealthy status, the service health status monitoring engine 414 may determine that the gateway software service data objects C1, C2, and C3, and the inventory software service data objects C2 and C3 (and optionally the identity software service data object C1) are impacted software service data objects. In some embodiments, the service health status monitoring engine 414 may provide the identity software service data object C1, the gateway software service data objects C1, C2, and C3, and the inventory software service data objects C2 and C3, as well as the order software service data object C1, to an incident creation engine 418.

In some embodiments, the incident creation engine 418 comprises software algorithms and/or associated hardware that programmatically generates incident data objects. In some embodiments, the incident creation engine 418 may provide an incident data object creation user interface that allows a user to provide inputs to facilitate the creation of an incident data object, details of which are described herein.

Referring now to FIG. 5, an example method 500 is illustrated. In particular, the example method 500 illustrates example steps/operations of generating service health status data objects associated with one or more software service data objects in a cloud-based software service system and rendering a health status monitoring user interface in accordance with some embodiments of the present disclosure.

In the example shown in FIG. 5, the example method 500 starts at step/operation 501 and then proceeds to step/operation 503. At step/operation 503, a processing circuitry (such as the processor 305 of the service health status monitoring server 107 described above in connection with at least FIG. 1 and FIG. 3) receives one or more metric-based alert data objects associated with the cloud-based software service system.

In some embodiments, the one or more metric-based alert data objects are associated with a cloud-based software service system. For example, the metric-based alert data objects may be received from a service system metric monitoring platform that is in data communications with the cloud-based software service system.

As described above, the service system metric monitoring platform may monitor metrics associated with the cloud-based software service system. For example, the service system metric monitoring platform may monitor gauge metrics, counter metrics, and/or the like. In some embodiments, the service system metric monitoring platform may generate metric-based alert data objects based at least in part on the metrics associated with the cloud-based software service system.

In some embodiments, the one or more metric-based alert data objects comprise at least one of one or more system alert data objects or one or more system metric data objects. In some embodiments, the one or more metric-based alert data objects comprise system-monitored metric metadata. For example, the system-monitored metric metadata of a system alert data object may indicate an alert or a notification. Additionally, or alternatively, the system-monitored metric metadata of a system metric data object may indicate one or more metrics.

As an example, the processing circuitry may receive a metric-based alert data object associated with the cloud-based software service system that is in the form of a system alert data object. For example, the system-monitored metric metadata of the system alert data may comprise an alert that a particular cloud-based software service server of the cloud-based software service system returns a 5XX error (e.g. when the cloud-based software service server cannot successfully complete a client's request).

Referring back to FIG. 5, subsequent to step/operation 503, the method 500 proceeds to step/operation 505. At step/operation 505, a processing circuitry (such as the processor 305 of the service health status monitoring server 107 described above in connection with at least FIG. 1 and FIG. 3) retrieves one or more metric-based rule data objects associated with the one or more software service data objects.

Similar to those described above in connection with at least FIG. 1, the processing circuitry may receive one or more metric-based rule data objects from one or more client devices. In some examples, the processing circuitry may store the one or more metric-based rule data objects in a service health status monitoring data repository. In such examples, subsequent to and/or in response to receiving the one or more metric-based alert data objects at step/operation 503, the processing circuitry may retrieve the one or more metric-based rule data objects from the service health status monitoring data repository at step/operation 505.

In some embodiments, the one or more metric-based rule data objects comprise user-defined mapping metadata. As described above, the user-defined mapping metadata may comprise one or more metric-to-service mapping indicators and/or one or more metric-to-health mapping indicators. For example, the one or more metric-to-service mapping indicators may define or indicate, based on one or more software service identification criteria, which software service data object(s) that one or more metric-based alert data objects received at step/operation 503 are associated with. Additionally, or alternatively, the one or more metric-to-health mapping indicators define what health level or health levels of software services that one or more metric-based alert data objects received at step/operation 503 indicate.

Continuing from the example above, the processing circuitry may retrieve a plurality of metric-based rule data objects that are associated with the cloud-based software service system. As described above, the plurality of metric-based rule data objects comprise user-defined mapping metadata that may comprise, for example, metric-to-service mapping indicator(s) having software service identification criteria indicating a 5XX error from the particular cloud-based software service server and/or metric-to-health mapping indicator(s) having software service health criteria indicating a 5XX error from that particular cloud-based software service server.

Referring back to FIG. 5, subsequent to step/operation 505, the method 500 proceeds to step/operation 507. At step/operation 507, a processing circuitry (such as the processor 305 of the service health status monitoring server 107 described above in connection with at least FIG. 1 and FIG. 3) generates a service health status data object.

In some embodiments, the service health status data object generated by the processing circuitry is uniquely associated with a software service data object of the cloud-based software service system and indicates a health level or status associated with that software service data object (or software service). For example, the processing circuitry may generate the service health status data object based at least in part on the system-monitored metric metadata of the one or more metric-based alert data objects received at step/operation 503 and the user-defined mapping metadata of the one or more metric-based rule data objects retrieved at step/operation 505.

For example, step/operation 507 may comprise one or more additional steps/operations. As shown in FIG. 5, step/operation 507 may comprise step/operation 513 and step/operation 515.

In some embodiments, at step/operation 513, a processing circuitry (such as the processor 305 of the service health status monitoring server 107 described above in connection with at least FIG. 1 and FIG. 3) determines that at least one of the one or more metric-based alert data objects is associated with a software service data object of the one or more software service data objects.

In some embodiments, the processing circuitry may determine an association between a metric-based alert data object and a software service data object based at least in part on the metric-to-service mapping indicator of the user-defined mapping metadata associated with the one or more metric-based rule data objects retrieved at step/operation 505.

As described above, the metric-to-service mapping indicator may comprise one or more software service identification criteria and one or more software service data object identifiers corresponding to the one or more software service identification criteria. In some embodiments, the one or more software service identification criteria may set forth one or more conditions associated with the metric-based alert data objects received at step/operation 503. If a metric-based alert data object received at step/operation 503 satisfies the one or more conditions, the metric-to-service mapping indicator indicates that the metric-based alert data object is associated with the software service data object that is identified by the software service data object identifier corresponding to the one or more conditions.

Continuing from the example described above, the metric-to-service mapping indicator of the user-defined mapping metadata associated with the one or more metric-based rule data objects retrieved at step/operation 505 may comprise a software service identification criterion that indicates a 5XX error and a software service data object identifier that corresponds to the software service identification criterion. In such an example, the processing circuitry may determine that the metric-based alert data object received at step/operation 503 satisfies the software service identification criterion, and may determine that the metric-based alert data object is associated with the software service data object that is identified by the software service data object identifier. For example, the software service data object identifier (that corresponds to the software service identification criterion indicating a 5XX error) may identify a particular order software service data object. In such an example, the processing circuitry determines that the metric-based alert data object received at step/operation 503 is associated with the particular order software service data object.

Referring back to FIG. 5, subsequent to step/operation 513, the method 500 proceeds to step/operation 515. At step/operation 515, a processing circuitry (such as the processor 305 of the service health status monitoring server 107 described above in connection with at least FIG. 1 and FIG. 3) generates service health status metadata of the service health status data object that indicates a service health status of the software service data object.

In some embodiments, the service health status metadata indicates a software service health level of the software service data object. In some embodiments, the processing circuitry may generate the service health status metadata based at least in part on the metric-to-health mapping indicator of the user-defined mapping metadata associated with the one or more metric-based rule data objects retrieved at step/operation 505.

As described above, the metric-to-health mapping indicator may comprise one or more software service health criteria and one or more software service health level identifiers corresponding to the one or more software service health criteria. In some embodiments, the one or more software service health criteria may set forth one or more conditions associated with the metric-based alert data objects received at step/operation 503. If a metric-based alert data object received at step/operation 503 satisfies the one or more conditions, the metric-to-health mapping indicator indicates that the metric-based alert data object indicates a software service health level that is identified by the software service health level identifier corresponding to the one or more conditions.

Continuing from the example described above, the metric-to-health mapping indicator of the user-defined mapping metadata associated with the one or more metric-based rule data objects retrieved at step/operation 505 may comprise a software health identification criterion that indicates a 5XX error and a software service health level identifier that corresponds to the software service health criterion. In such an example, the processing circuitry may determine that the metric-based alert data object received at step/operation 503 satisfies the software service health criterion, and may determine that the metric-based alert data object indicates a software service health level that is identified by the software service health level identifier. For example, the software service health level identifier (that corresponds to the software service health criterion indicating a 5XX error) may identify a software service health level of 30%. In such an example, the processing circuitry determines that the metric-based alert data object received at step/operation 503 indicates a software service health level of 30%.

Referring back to FIG. 5, subsequent to step/operation 507 (or step/operation 515), the method 500 proceeds to step/operation 509. At step/operation 509, a processing circuitry (such as the processor 305 of the service health status monitoring server 107 described above in connection with at least FIG. 1 and FIG. 3) causes rendering a health status monitoring user interface.

As described above, the health status monitoring user interface refers to a human-computer interface that is rendered for display on a client device and displays data and/or information related to the health levels of the software services in the cloud-based software service system. For example, the health status monitoring user interface comprises a service health status user interface object that corresponds to a software service data object based at least in part on the service health status data object generated at step/operation 507. Examples of health status monitoring user interfaces and service health status user interface objects are illustrated and described herein.

Referring back to FIG. 5, subsequent to step/operation 509, the method 500 proceeds to step/operation 511 and ends.

Referring now to FIG. 6A and FIG. 6B, an example method 600 is illustrated. In particular, the example method 600 illustrates example steps/operations of generating a service health status data object in accordance with some embodiments of the present disclosure.

In the example shown in FIG. 6A, the example method 600 starts at step/operation 602 and then proceeds to step/operation 604. At step/operation 604, a processing circuitry (such as the processor 305 of the service health status monitoring server 107 described above in connection with at least FIG. 1 and FIG. 3) determines whether all metric-based alert data objects have been traversed.

For example, as described above in connection with at least step/operation 503 of FIG. 5, the processing circuitry may receive one or more metric-based alert data objects that are associated with the cloud-based software service system.

In some embodiments, the one or more metric-based alert data objects may comprise system-monitored metric metadata that indicates one or more alerts/notifications and/or one or more metrics.

Further, as described above in connection with at least step/operation 505 of FIG. 5, the processing circuitry may retrieve one or more metric-based rule data objects that comprise user-defined mapping metadata. In some embodiments, the user-defined mapping metadata may comprise one or more metric-to-service mapping indicators and/or one or more metric-to-health mapping indicators. The one or more metric-to-service mapping indicators may comprise one or more software service identification criteria. The one or more metric-to-health mapping indicators may comprise one or more software service health criteria.

In some embodiments, the processing circuitry may traverse a metric-based alert data object by comparing the system-monitored metric metadata of the metric-based alert data object with the software service identification criteria and/or the software service health criteria. As such, at step/operation 604, the processing circuitry may determine whether all system-monitored metric metadata of metric-based alert data objects have been compared with the software service identification criteria and/or the software service health criteria.

If, at step/operation 604, the processing circuitry determines that all metric-based alert data objects have been traversed, the example method 600 proceeds to step/operation 614 and end. For example, if the processing circuitry determines that all system-monitored metric metadata of metric-based alert data objects have been compared with the software service identification criteria and/or the software service health criteria, the example method proceeds to step/operation 614 and ends.

If, at step/operation 604, the processing circuitry determines that not all metric-based alert data objects have been traversed, the example method 600 proceeds to step/operation 606. At step/operation 606, a processing circuitry (such as the processor 305 of the service health status monitoring server 107 described above in connection with at least FIG. 1 and FIG. 3) extracts the system-monitored metric metadata from the one or more metric-based alert data objects.

In some embodiments, if the processing circuitry determines that at least one metric-based alert data object has not been traversed, the example method 600 may proceed to traverse the at least one metric-based alert data object. In some embodiments, traversing the at least one metric-based alert data object may include determining that at least one of the one or more metric-based alert data objects is associated with a software service data object of the one or more software service data objects, similar to those described above in connection with at least step/operation 513 of FIG. 5.

For example, when determining that the at least one of the one or more metric-based alert data objects is associated with the software service data object, the processing circuitry may first extract the system-monitored metric metadata from the one or more metric-based alert data objects that have not been traversed. As described above, the system-monitored metric metadata may represent, comprise, and/or indicate one or more alerts and/or notifications (if the metric-based alert data object is in the form of a system alert data object), or one or more metrics associated with the cloud-based software service system (if the metric-based alert data object is in the form of a system metric data object).

Referring back to FIG. 6A, subsequent to step/operation 606, the method 600 proceeds to step/operation 608. At step/operation 608, a processing circuitry (such as the processor 305 of the service health status monitoring server 107 described above in connection with at least FIG. 1 and FIG. 3) determines whether the system-monitored metric metadata satisfies a software service identification criterion.

As described above in connection with at least step/operation 505 of FIG. 5, the processing circuitry may retrieve one or more metric-based rule data objects that are associated with one or more software service data objects and comprise user-defined mapping metadata. In some embodiments, the user-defined mapping metadata comprises one or more metric-to-service mapping indicators.

In some embodiments, the metric-to-service mapping indicator comprises one or more software service identification criteria and one or more software service data object identifiers. As described above, each of the one or more software service identification criteria corresponds to one of the one or more software service data object identifiers, and each of the one or more software service data object identifiers is associated with one of the one or more software service data objects.

For example, the software service identification criterion may describe one or more conditions that are related to the system-monitored metric metadata. If the system-monitored metric metadata satisfies the one or more conditions, the processing circuitry may determine that the system-monitored metric metadata satisfies the software service identification criterion. If the system-monitored metric metadata does not satisfy the one or more conditions, the processing circuitry may determine that the system-monitored metric metadata does not satisfy the software service identification criterion.

As an example, the system-monitored metric metadata may represent, comprise, and/or indicate one or more values of one or more metrics (for example, but not limited to, gauge metrics, counter metrics, and/or the like). In some embodiments, the software service identification criterion may provide a value threshold or a value range associated with metrics. If the value of the metric associated with the system-monitored metric metadata satisfies the value threshold or falls within the value range, the processing circuitry may determine that the system-monitored metric metadata satisfies the software service identification criterion at step/operation 608. If the value of the metric associated with the system-monitored metric metadata does not satisfy the value threshold or falls outside the value range, the processing circuitry may determine that the system-monitored metric metadata does not satisfy the software service identification criterion at step/operation 608.

As another example, the system-monitored metric metadata may represent, comprise, and/or indicate one or more alerts or notifications. In some embodiments, the software service identification criterion may indicate one or more types of alerts and/or notifications. If the alerts or notifications associated with the system-monitored metric metadata is associated with one of the one or more types of alerts and/or notifications as indicated by the software service identification criterion, the processing circuitry may determine that the system-monitored metric metadata satisfies the software service identification criterion at step/operation 608. If the alerts or notifications associated with the system-monitored metric metadata is not associated with any one of the one or more types of alerts and/or notifications as indicated by the software service identification criterion, the processing circuitry may determine that the system-monitored metric metadata does not satisfy the software service identification criterion at step/operation 608.

If, at step/operation 608, the processing circuitry determines that the system-monitored metric metadata does not satisfy the software service identification criterion, the method 600 returns to step/operation 604.

For example, in response to determining that the system-monitored metric metadata does not satisfy the software service identification criterion, the processing circuitry may determine that the corresponding metric-based rule data object does not indicate which software service data object that the metric-based alert data object is associated with. In some embodiments, the example method 600 returns to step/operation 604 and the processing circuitry continues traversing other metric-based alert data objects.

If, at step/operation 608, the processing circuitry determines that the system-monitored metric metadata satisfies the software service identification criterion, the method 600 returns to step/operation 610. At step/operation 610, a processing circuitry (such as the processor 305 of the service health status monitoring server 107 described above in connection with at least FIG. 1 and FIG. 3) determines a software service data object identifier corresponds to the metric criterion.

As described above, the metric-to-service mapping indicator provides data correlations/mapping between software service identification criteria and software service data object identifiers. In some embodiments, in response to determining that the system-monitored metric metadata satisfies the software service identification criterion at step/operation 608, the processing circuitry determines a software service data object identifier corresponds to the software service identification criterion based on the correlations/mapping provided by the metric-to-service mapping indicator.

Referring back to FIG. 6A, subsequent to step/operation 610, the method 600 proceeds to step/operation 612. At step/operation 612, a processing circuitry (such as the processor 305 of the service health status monitoring server 107 described above in connection with at least FIG. 1 and FIG. 3) selects the software service data object corresponding to the software service data object identifier.

As described above, the software service data object identifier may uniquely identify a software service data object associated with the cloud-based software service system. As such, the processing circuitry may select the software service data object based on the software service data object identifier, and the software service data object is associated with the system-monitored metric metadata from the one or more metric-based alert data objects based at least in part on the metric-to-service mapping indicator.

As described above, each software service data object represents one or more features, attributes, functionalities and/or characteristics associated with and/or related to a software service. As such, the one or more metric-based alert data objects are associated with the software service that is represented by the software service data object selected at step/operation 612.

Referring back to FIG. 6A, subsequent to step/operation 612, the method 600 proceeds to block A, which connects FIG. 6A to FIG. 6B. Referring now to FIG. 6B, subsequent to block A (for example, subsequent to step/operation 612), the example method 600 proceeds to step/operation 616. At step/operation 616, a processing circuitry (such as the processor 305 of the service health status monitoring server 107 described above in connection with at least FIG. 1 and FIG.

3) determines whether the system-monitored metric metadata satisfies a software service health criterion.

As described above in connection with step/operation 608, the user-defined mapping metadata of metric-based rule data objects comprises one or more metric-to-service mapping indicators. In some embodiments, the user-defined mapping metadata of metric-based rule data objects also comprises one or more metric-to-health mapping indicators. In some embodiments, the one or more metric-to-health mapping indicators comprise one or more software service health criteria and one or more software service health level identifiers. As described above, each of the one or more software service health criteria corresponds to one of the one or more software service health level identifiers, and each of the one or more software service health level identifiers indicates a corresponding software service health level.

For example, the software service health criterion may describe one or more conditions that are related to the system-monitored metric metadata. If the system-monitored metric metadata satisfies the one or more conditions, the processing circuitry may determine that the system-monitored metric metadata satisfies the software service health criterion. If the system-monitored metric metadata does not satisfy the one or more conditions, the processing circuitry may determine that the system-monitored metric metadata does not satisfy the software service health criterion.

As an example, the system-monitored metric metadata may represent, comprise, and/or indicate one or more values of one or more metrics (for example, but not limited to, gauge metrics, counter metrics, and/or the like). In some embodiments, the software service health criterion may provide a value threshold or a value range associated with metrics. If the value of the metric associated with the system-monitored metric metadata satisfies the value threshold or falls within the value range, the processing circuitry may determine that the system-monitored metric metadata satisfies the software service health criterion at step/operation 616. If the value of the metric associated with the system-monitored metric metadata does not satisfy the value threshold or falls outside the value range, the processing circuitry may determine that the system-monitored metric metadata does not satisfy the software service health criterion at step/operation 616.

As another example, the system-monitored metric metadata may represent, comprise, and/or indicate one or more alerts or notifications. In some embodiments, the software service health criterion may indicate one or more types of alerts and/or notifications. If the alerts or notifications associated with the system-monitored metric metadata is associated with one of the one or more types of alerts and/or notifications as indicated by the software service health criterion, the processing circuitry may determine that the system-monitored metric metadata satisfies the software service health criterion at step/operation 616. If the alerts or notifications associated with the system-monitored metric metadata is not associated with any one of the one or more types of alerts and/or notifications as indicated by the software service health criterion, the processing circuitry may determine that the system-monitored metric metadata does not satisfy the software service health criterion at step/operation 616.

If, at step/operation 616, the processing circuitry determines that the system-monitored metric metadata does not satisfy the software service health criterion, the example method 600 returns to step/operation 604.

For example, in response to determining that the system-monitored metric metadata does not satisfy a software service health criterion, the processing circuitry may determine that the metric-based alert data object does not indicate any software service health level. In some embodiments, the example method 600 returns to step/operation 604 and the processing circuitry continues traversing other metric-based alert data objects.

If, at step/operation 616, the processing circuitry determines that the system-monitored metric metadata satisfies the software service health criterion, the example method 600 proceeds to step/operation 620. At step/operation 620, a processing circuitry (such as the processor 305 of the service health status monitoring server 107 described above in connection with at least FIG. 1 and FIG. 3) determines a software service health level identifier corresponds to the software service health criterion.

As described above, the metric-to-health mapping indicator provides data correlations/mapping between software service health criteria and software service health level identifiers. In some embodiments, in response to determining that the system-monitored metric metadata satisfies the software service health criterion at step/operation 620, the processing circuitry determines a software service health level identifier corresponds to the software service health criterion based on the correlations/mapping provided by the metric-to-health mapping indicator.

Referring back to FIG. 6B, subsequent to step/operation 620, the method 600 proceeds to step/operation 622. At step/operation 622, a processing circuitry (such as the processor 305 of the service health status monitoring server 107 described above in connection with at least FIG. 1 and FIG. 3) determines the service health status metadata based at least in part on the software service health level identifier.

As described above, the software service health level identifier may uniquely identify a software service health level. In some embodiments, the service health status metadata of the service health status data object indicates a software service health level associated with the software service data object that is selected at step/operation 612. As such, the processing circuitry may determine the service health status metadata based on the software service health level identifier.

As described above, each software service data object represents one or more features, attributes, functionalities and/or characteristics associated with and/or related to a software service. As such, the one or more metric-based alert data objects indicate a health level associated with the software service that is represented by the software service data object at step/operation 622.

Referring back to FIG. 6B, subsequent to step/operation 622, the method 600 proceeds to step/operation 624 and ends.

The example method 600 described above in connection with FIG. 6A and FIG. 6B provides example steps/operations of traversing metric-based alert data objects received from a service system metric monitoring platform. For example, to traverse a metric-based alert data object, a processing circuitry may extract the system-monitored metric metadata from the metric-based alert data object, and determine whether the system-monitored metric metadata satisfies a software service identification criterion from a metric-to-service mapping indicator of the user-defined mapping metadata associated with the metric-based rule data object. If not, the processing circuitry traverses the next metric-based alert data object. If so, the processing circuitry determines that the metric-based alert data object is associated with a particular software service data object identified by a software service data object identifier that corresponds to the software service identification criterion. Subsequently, the processing circuitry determines whether the system-monitored metric metadata satisfies a software service health criterion from a metric-to-health mapping indicator of the same user-defined mapping metadata. If not, the processing circuitry traverses the next metric-based alert data object. If so, the processing circuitry determines that the metric-based alert data object indicates that the particular software service data object is associated with a software service health level as identified by the software service health level identifier that corresponds to the software service health criterion.

While the description above in connection with FIG. 6A and FIG. 6B provides an example of traversing a metric-based alert data object to determine both the software service data object associated with the metric-based alert data object and the software service health level associated with the software service data object, it is noted that the scope of the present disclosure is not limited to the description above. In some examples, examples of the present disclosure may traverse an example metric-based alert data object to determine a software service data object being associated with the metric-based alert data object or a software service health level being indicated by the metric-based alert data object.

For example, when determining that the at least one of the one or more metric-based alert data objects is associated with the software service data object (for example, in connection with at least step/operation 513 of FIG. 5), the processing circuitry may extract the system-monitored metric metadata from the one or more metric-based alert data objects (for example, similar to those described above in connection with at least step/operation 606 of FIG. 6A), determine whether the system-monitored metric metadata satisfies a software service identification criterion of the one or more software service identification criteria (for example, similar to those described above in connection with at least step/operation 608 of FIG. 6A), and in response to determining that the system-monitored metric metadata satisfies the software service identification criterion: determine a software service data object identifier corresponds to the software service identification criterion (for example, similar to those described above in connection with at least step/operation 610 of FIG. 6A); and select the software service data object corresponding to the software service data object identifier (for example, similar to those described above in connection with at least step/operation 612 of FIG. 6A).

Additionally, or alternatively, when generating the service health status metadata of the service health status data object (for example, in connection with at least step/operation 515 of FIG. 5), the processing circuitry may extract the system-monitored metric metadata from the one or more metric-based alert data objects (for example, similar to those described above in connection with at least step/operation 606 of FIG. 6A); determine whether the system-monitored metric metadata satisfies a software service health criterion of the one or more software service health criteria (for example, similar to those described above in connection with at least step/operation 616 of FIG. 6B); and in response to determining that the system-monitored metric metadata satisfies the software service health criterion: determine a software service health level identifier corresponds to the software service health criterion (for example, similar to those described above in connection with at least step/operation 620 of FIG. 6B); and determine the service health status metadata based at least in part on the software service health level identifier (for example, similar to those described above in connection with at least step/operation 622 of FIG. 6B).

Referring now to FIG. 7A and FIG. 7B, an example method 700 is illustrated. In particular, the example method 700 illustrates example steps/operations of adjusting the service health status metadata of the service health status data object based at least in part on a service dependency data object in accordance with some embodiments of the present disclosure.

In the example shown in FIG. 7A, the example method 700 starts at block 701 and then proceeds to step/operation 703. At step/operation 703, a processing circuitry (such as the processor 305 of the service health status monitoring server 107 described above in connection with at least FIG. 1 and FIG. 3) retrieves a service dependency data object associated with the cloud-based software service system.

In some embodiments, the service dependency data object comprises service dependency metadata associated with the one or more software service data objects of the cloud-based software service system. As described above, the service dependency metadata describes, indicates, and/or represents related software service data objects associated with one or more software service data objects of the cloud-based software service system.

Referring back to FIG. 7A, subsequent to step/operation 703, the method 700 proceeds to step/operation 705. At step/operation 705, a processing circuitry (such as the processor 305 of the service health status monitoring server 107 described above in connection with at least FIG. 1 and FIG. 3) determines at least one related software service data object associated with a software service data object.

In some embodiments, the processing circuitry determines the at least one related software service data object associated with the software service data object based at least in part on the service dependency metadata of the service dependency data object retrieved at step/operation 703.

For example, based at least in part on the service dependency metadata, the processing circuitry may determine one or more child software service data objects, one or more grandchild software service data objects, one or more great grandchild software service data objects, and/or the like. Additionally, or alternatively, the processing circuitry may determine one or more parent software service data objects, one or more grandparent software service data objects, one or more great grandparent software service data objects, and/or the like.

Referring back to FIG. 7A, subsequent to step/operation 705, the method 700 proceeds to step/operation 707. At step/operation 707, a processing circuitry (such as the processor 305 of the service health status monitoring server 107 described above in connection with at least FIG. 1 and FIG. 3) determines at least one related service health status data object associated with the at least one related software service data object.

For example, the processing circuitry may determine the at least one related service health status data object associated with the at least one related software service data object based on various example methods described herein, including but not limited to, those described above in connection with at least FIG. 4 to FIG. 6B.

In some embodiments, the at least one related service health status data object indicates at least one related software service health level of the at least one related software service data object. For example, if the related software service data object is a child software service data object, the corresponding related service health status data object indicates a related software service health level of the child software service data object. If the related software service data object is a parent software service data object, the corresponding related service health status data object indicates a software service health level of the parent software service data object.

Referring back to FIG. 7A, subsequent to step/operation 707, the method 700 proceeds to step/operation 709. At step/operation 709, a processing circuitry (such as the processor 305 of the service health status monitoring server 107 described above in connection with at least FIG. 1 and FIG. 3) adjusts, based at least in part on the at least one related service health status data object, the service health status metadata of the service health status data object.

In some embodiments, step/operation 709 may comprise one or more additional steps/operations. For example, step/operation 709 may be directed to block A, which connects FIG. 7A to FIG. 7B. Referring now to FIG. 7B, subsequent to and/or in response to block A, the example method 700 proceeds to step/operation 704. At step/operation 704, a processing circuitry (such as the processor 305 of the service health status monitoring server 107 described above in connection with at least FIG. 1 and FIG. 3) determines whether the related service health status data object that is determined at step/operation 707 of FIG. 7A indicates a healthy status or an unhealthy status.

As described above, the related service health status data object may indicate a related software service health level associated with the related software service data object. For example, the related service health status data object may provide the related software service health level in the form of a binary value (e.g. a healthy status or an unhealthy status). As another example, the service health status data object provides the related software service health level in the form of a percentage value. In such an example, the processing circuitry may determine whether the percentage value satisfies a threshold value. If not, the processing circuitry may determine that the related service health status data object indicates an unhealthy status. If so, the processing circuitry may determine that the related service health status data object indicates a healthy status.

If, at step/operation 704, the processing circuitry determines that the related service health status data object indicates an unhealthy status, the method 700 proceeds to step/operation 706. At step/operation 706, a processing circuitry (such as the processor 305 of the service health status monitoring server 107 described above in connection with at least FIG. 1 and FIG. 3) decreases a software service health level associated with the service health status of the software service data object.

As an example, the at least one related software service data object that is determined at step/operation 705 of FIG. 7A may be a child software service data object of the software service data object. In response to determining that the at least one related service health status data object associated with the child software service data object indicates the unhealthy status, the processing circuitry may decrease the software service health level associated with the software service data object.

As illustrated in the example above, the processing circuitry may determine that the software service health level of a child software service data object may affect the software service health level of its parent software service data object, and may adjust the software service health level of the parent software service data object according to the software service health level of the child software service data object.

Referring back to FIG. 7B, if, at step/operation 704, the processing circuitry determines that the related service health status data object indicates a healthy status, the method 700 proceeds to step/operation 708. At step/operation 708, a processing circuitry (such as the processor 305 of the service health status monitoring server 107 described above in connection with at least FIG. 1 and FIG. 3) increases a software service health level associated with the service health status of the software service data object.

As an example, the at least one related software service data object that is determined at step/operation 705 of FIG. 7A may be a parent software service data object of the software service data object. In response to determining that the at least one related service health status data object associated with the parent software service data object indicates the healthy status, the processing circuitry may increase the software service health level associated with the software service data object.

As illustrated in the example above, the processing circuitry may determine that the software service health level of a parent software service data object may affect the software service health level of its child software service data object, and may adjust the software service health level of the child software service data object according to the software service health level of the parent software service data object.

Referring back to FIG. 7B, subsequent to step/operation 706 and step/operation 708, the example method 700 proceeds to block B, which connects FIG. 7B back to FIG. 7A. Referring back to FIG. 7A, subsequent to step/operation 709, the method 700 proceeds to block 711 and ends.

Referring now to FIG. 8, an example method 800 is illustrated. In particular, the example method 800 illustrates example steps/operations of identifying impacted software service data objects based on the service health status data objects and the service dependency data object.

In the example shown in FIG. 8, the example method 800 starts at step/operation 802 and then proceeds to step/operation 804. At step/operation 804, a processing circuitry (such as the processor 305 of the service health status monitoring server 107 described above in connection with at least FIG. 1 and FIG. 3) generates a service health status data object associated with a software service data object.

For example, the processing circuitry may generate a service health status data object in accordance with various example methods described herein, including, but not limited to, those described above in connection with at least FIG. 4 to FIG. 7B. As described above, the service health status data object indicates a software service health level associated with the software service data object.

Referring back to FIG. 8, subsequent to and/or in response to step/operation 804, the example method 800 proceeds to step/operation 806. At step/operation 806, a processing circuitry (such as the processor 305 of the service health status monitoring server 107 described above in connection with at least FIG. 1 and FIG. 3) determines whether the service health status data object indicates an unhealthy status.

As described above, the service health status data object may indicate a software service health level associated with the software service data object. For example, the service health status data object may provide the software service health level in the form of a binary value (e.g. a healthy status or an unhealthy status). As another example, the service health status data object may provide the software service health level in the form of a percentage value. In such an example, the processing circuitry may determine whether the percentage value satisfies a threshold value. If not, the processing circuitry may determine that the service health status data object indicates an unhealthy status. If so, the processing circuitry may determine that the service health status data object does not indicate an unhealthy status.

If, at step/operation 806, the processing circuitry determines that the service health status data object does not indicate an unhealthy status, the example method 800 proceeds to step/operation 814 and ends.

For example, if the service health status data object does not indicate an unhealthy status, the processing circuitry may determine that the cloud-based software service system is consistently, successfully, and/or quickly providing the software service corresponding to the software service data object associated with the service health status data object. As such, the processing circuitry may determine that there is no incident associated with the software service, and/or that there is no impacted software service.

Referring back to FIG. 8, if, at step/operation 806, the processing circuitry determines that the service health status data object indicates an unhealthy status, the example method 800 proceeds to step/operation 808. At step/operation 808, a processing circuitry (such as the processor 305 of the service health status monitoring server 107 described above in connection with at least FIG. 1 and FIG. 3) retrieves a service dependency data object associated with the cloud-based software service system.

For example, the service dependency data object may comprise service dependency metadata associated with the one or more software service data objects of the cloud-based software service system. In some embodiments, the service dependency metadata describes, indicates, and/or represents related software service data objects associated with one or more software service data objects of the cloud-based software service system.

Referring now to FIG. 9, an example diagram illustrating an example service dependency data object 900 is provided. In particular, the example service dependency data object 900 illustrates dependencies between and among software service data objects associated with the software service 901A, software service data objects associated with the software service 901B, software service data objects associated with the software service 901C, and/or software service data objects associated with the software service 901D.

Similar to those described above in connection with FIG. 4, the software service 901A may be a getaway service, the software service 901B may be an identity service, the software service 901C may be an order service, and the software service 901D may be an inventory service. In such an example, example service dependency data object 900 illustrates dependency information associated with the gateway software service data objects C1, C2, and C3, identity software service data object C1, order software service data object C1, and/or inventory software service data object C2 and C3.

In particular, the example service dependency data object 900 shown in FIG. 9 illustrates that the gateway software service data object C3 is a parent software service data object of the gateway software service data object C2. The gateway software service data objects C1 and C2 are parent software service data objects of the identity software service data object C1. The identity software service data object C1 is a parent software service data object of the order software service data object C1. The order software service data object C1 is a parent software service data object of the inventory software service data objects C2 and C3.

Referring back to FIG. 8, subsequent to and/or in response to step/operation 808, the example method 800 proceeds to step/operation 810. At step/operation 810, a processing circuitry (such as the processor 305 of the service health status monitoring server 107 described above in connection with at least FIG. 1 and FIG. 3) determines at least one related software service data object associated with the software service data object.

In some embodiments, the at least one related software service data object associated with the software service data object may comprise one or more parent software service data object associated with the software service data object and/or one or more child software service data object associated with the software service data object according to traversing the example service dependency data object 900. Additionally, or alternatively, the at least one related software service data object associated with the software service data object may comprise grandchild software service data objects, great grandchild software service data objects, grandparent software service data objects, great grandparent software service data objects, and/or the like.

Referring now to FIG. 9, the order software service data object C1 may be associated with a service health status data object that indicates an unhealthy status. In some embodiments, in response to determining that the service health status data object indicates an unhealthy status, the processing circuitry may determine one or more related software service data objects of the order software service data object C1 based on the example service dependency data object 900. For example, the processing circuitry may determine that the identity software service data object C1 is a parent software service data object of the order software service data object C1, and therefore is a related software service data object of the order software service data object C1. Additionally, or alternatively, the processing circuitry may determine that the inventory software service data object C2 and C3 are child software service data objects of the order software service data object C1, and therefore are related software service data objects of the order software service data object C1.

Referring back to FIG. 8, subsequent to and/or in response to step/operation 810, the example method 800 proceeds to step/operation 812. At step/operation 812, a processing circuitry (such as the processor 305 of the service health status monitoring server 107 described above in connection with at least FIG. 1 and FIG. 3) designates the at least one related software service data object as at least one impacted software service data object associated with the software service data object.

In some embodiments, when a first software service data object is designated as an impacted software service data object associated with the second software service data object, it indicates that the software service health level of the first software service data object may be impacted by the second software service data object. In some embodiments, the processing circuitry may designate the first software service data object as an impacted software service data object associated with the second software service data object through updating metadata of the first software service data object and/or the second software service data object.

In some embodiments, the processing circuitry may create an incident data object indicating the impacted software service data objects. For example, the processing circuitry may cause rendering of an incident data object creation user interface, details of which are described herein.

Referring back to FIG. 8, subsequent to and/or in response to step/operation 812, the example method 800 proceeds to step/operation 814 and ends.

Example User Interfaces for Implementing Embodiments of the Present Disclosure Various example user interfaces described herein, including, for example, those as shown in FIG. 10 to FIG. 14, may provide various technical advantages and/or improvements described above.

Referring now to FIG. 10, an example metric-based rule data object creation user interface 1000 in accordance with some embodiments of the present disclosure is illustrated.

In some embodiments, the example metric-based rule data object creation user interface 1000 may comprise a header portion 1002, a metric-to-service mapping indicator generation portion 1004 that is positioned under the header portion 1002, and a metric-to-health mapping indicator generation portion 1006 that is positioned under the metric-to-service mapping indicator generation portion 1004.

In some embodiments, the header portion 1002 may identify that the metric-based rule data object creation user interface 1000 is for generating service metric rules (for example, metric-based rule data objects as described herein).

In some embodiments, the metric-to-service mapping indicator generation portion 1004 may comprise one or user interface elements that can facilitate the creation of metric-to-service mapping indicators of user-defined mapping metadata associated with the metric-based rule data object. In the example shown in FIG. 10, the metric-to-service mapping indicator generation portion 1004 may comprise a software service identification criterion generation sub-portion 1008 and a software service data object identifier selection sub-portion 1010.

In some embodiments, the software service identification criterion generation sub-portion 1008 may comprise one or more drop-down menus that allow a user to specify one or more criteria associated with the metric-based alert data objects. For example, the software service identification criterion generation sub-portion 1008 may enable a user to define one or more conditions associated with the software service identification criteria. As an example, the user may define conditions such as, but not limited to, the alert and/or the notification indicated by the system-monitored metric metadata of the metric-based alert data object containing certain phrases and/or words.

In some embodiments, the software service data object identifier selection sub-portion 1010 may comprise one or more drop-down menus or input boxes that allow a user to select one or more software service data object identifiers associated with one or more software service data objects. In such an example, if system-monitored metric metadata of a metric-based alert data object satisfies the conditions set forth in the conditions defined in the software service identification criterion generation sub-portion 1008, the metric-based alert data object is associated with a software service data object associated with the software service data object identifier that is selected in the software service data object identifier selection sub-portion 1010.

In some embodiments, the metric-to-health mapping indicator generation portion 1006 may comprise one or user interface elements that can facilitate the creation of metric-to-health mapping indicators of user-defined mapping metadata associated with the metric-based rule data object. In the example shown in FIG. 10, the metric-to-health mapping indicator generation portion 1006 may comprise a software service health criterion generation sub-portion 1012 and a software service health level identifier selection sub-portion 1014.

In some embodiments, the software service health criterion generation sub-portion 1012 may comprise one or more drop-down menus that allow a user to specify one or more criteria associated with the metric-based alert data objects. For example, the software service health criterion generation sub-portion 1012 may enable a user to define one or more conditions associated with the software service health criteria. As an example, the user may define conditions such as, but not limited to, the alert and/or the notification indicated by the system-monitored metric metadata of the metric-based alert data object containing certain phrases and/or words.

In some embodiments, the software service health level identifier selection sub-portion 1014 may comprise one or more drop-down menus or input boxes that allow a user to select one or more software service health level identifiers associated with one or more software service data objects. In such an example, if system-monitored metric metadata of a metric-based alert data object satisfies the conditions set forth in the conditions defined in the software service health criterion generation sub-portion 1012, the metric-based alert data object indicates a software service health level according to the software service health level identifier that is selected in the software service data object identifier selection sub-portion 1010.

In some embodiments, the metric-based rule data object creation user interface 1000 further comprises a Cancel user interface button 1016 and a Create Rule user interface button 1018. When a user clicks, taps, or otherwise selects the Create Rule user interface button 1018, a metric-based rule data object may be generated based on the user input provided through the metric-based rule data object creation user interface 1000. When a user clicks, taps, or otherwise selects the Cancel user interface button 1016, the creation of a metric-based rule data object may be canceled.

Referring now to FIG. 11, an example health status monitoring user interface 1100 in accordance with some embodiments of the present disclosure is illustrated. In particular, the example health status monitoring user interface 1100 illustrates the example health status associated with an order software service data object C1.

In the example shown in FIG. 11, the example health status monitoring user interface 1100 may comprise a header portion 1101. In some embodiments, the header portion 1101 may identify which software service data object that the health status monitoring user interface 1100 is associated with (for example, the order software service data object C1 as illustrated in FIG. 11).

In the example shown in FIG. 11, the example health status monitoring user interface 1100 may comprise a description portion 1103 that is positioned under the header portion 1101. In some embodiments, the description portion 1103 may comprise a description of the software service data object that the health status monitoring user interface 1100 is associated with (for example, a description of the order software service data object C1).

In the example shown in FIG. 11, the example health status monitoring user interface 1100 may comprise a service health status user interface object 1105 that is positioned under the description portion 1103. In some embodiments, the service health status user interface object 1105 may be generated based at least in part on a service health status data object that is generated in accordance with various example methods described herein. In the example shown in FIG. 11, the service health status user interface object 1105 indicates that a software service health level associated with the order software service data object C1 is unhealthy.

In the example shown in FIG. 11, the example health status monitoring user interface 1100 may comprise a software service data object incident portion 1107 that is positioned adjacent to the service health status user interface object 1105. In some embodiments, the software service data object incident portion 1107 may identify any open incident that is associated with the order software service data object C1.

In the example shown in FIG. 11, the example health status monitoring user interface 1100 may comprise an incident status updates portion 1109 that is positioned under the service health status user interface object 1105 and the software service data object incident portion 1107. In some embodiments, the incident status updates portion 1109 may list status updates of any incident data objects associated with the software service data object.

In the example shown in FIG. 11, the example health status monitoring user interface 1100 may comprise a service relationship portion 1111. In some embodiments, the service relationship portion 1111 may indicate any related software service data objects associated with the order software service data object C1 (for example, any software service data object that depends on the order software service data object C1). In some embodiments, the service relationship portion 1111 comprises an impacted services user interface button 1113.

In some embodiments, a clicking, tapping, or otherwise selecting on the impacted services user interface button 1113 by a user triggers a service dependency graph user interface to be rendered for display.

Referring now to FIG. 12, an example service dependency graph user interface 1200 in accordance with some embodiments of the present disclosure is illustrated.

In the example shown in FIG. 12, the example service dependency graph user interface 1200 may comprise one or more nodes that are connected via one or more edges. In some embodiments, each node represents a software service data object, and an edge connecting two nodes indicates a dependency relationship between the two software service data objects.

In some embodiments, the example service dependency graph user interface 1200 may be generated based on retrieving a service dependency data object and determining one or more related software service data objects and/or impacted software service data objects associated with the software service data object. For example, the example service dependency graph user interface 1200 may comprise a node 1202 that represents the order software service data object C1.

In some embodiments, the service dependency metadata of the service dependency data object indicates that the order software service data object C1 is a parent software service data object for an inventory software service data object C2 and an inventory software service data object C3. As such, the example service dependency graph user interface 1200 comprises a node 1210 that represents the inventory software service data object C2 and a node 1206 that represents the inventory software service data object C3. In some embodiments, the example service dependency graph user interface 1200 further comprises edges connecting the node 1202 to the node 1210 and the node 1206, which represent the service dependency relationship between the order software service data object C1 and the inventory software service data objects C2/C3.

In some embodiments, the service dependency metadata of the service dependency data object indicates that the order software service data object C1 is a child software service data object of a gateway software service data object C1, a gateway software service data object C2, a gateway software service data object C3, and an identity software service data object C1. As such, the example service dependency graph user interface 1200 comprises a node 1214 that represents the gateway software service data object C1, a node 1204 that represents the gateway software service data object C2, a node 1208 that represents the gateway software service data object C3, and a node 1212 that represents identity software service data object C1. In some embodiments, the example service dependency graph user interface 1200 further comprises edges connecting the node 1202 to the node 1214, the node 1204, the node 1208 and the node 1212, which represent the service dependency relationship between the order software service data object C1 and the gateway software service data object C1, the gateway software service data object C2, the gateway software service data object C3, and the identity software service data object C1.

In some embodiments, a clicking, tapping, or otherwise selecting on a node in the example service dependency graph user interface 1200 by a user triggers an incident data object creation user interface to be rendered for display. For example, the example service dependency graph user interface 1200 may indicate that the order service associated with the order software service data object C1 is unhealthy, and a user may click, tap, or otherwise select node 1202 to trigger the incident data object creation user interface.

Referring now to FIG. 13, an example incident data object creation user interface 1300 in accordance with some embodiments of the present disclosure is illustrated.

In the example shown in FIG. 13, the example incident data object creation user interface 1300 comprises a header portion 1301. As shown, the header portion 1301 indicates that the example incident data object creation user interface 1300 is for creating an incident data object.

In the example shown in FIG. 13, the example incident data object creation user interface 1300 comprises an incident message portion 1303 that is positioned under the header portion 1301. As shown, the incident message portion 1303 may comprise one or more input boxes that allow a user to provide a title of the incident.

In the example shown in FIG. 13, the example incident data object creation user interface 1300 comprises an incident summary portion 1305 that is positioned under the incident message portion 1303. As shown, the incident summary portion 1305 may comprise one or more input boxes that allow a user to provide a summary of the incident.

In the example shown in FIG. 13, the example incident data object creation user interface 1300 comprises an impacted services selection portion 1307 that is positioned under the incident summary portion 1305. In some embodiments, the impacted services selection portion 1307 may list one or more impacted software service data objects, which may be determined based at least in part on the example methods described above in connection with at least FIG. 8 and FIG. 9. For example, the impacted software service data objects may include the related software service data objects of the order software service data object C1 (e.g. the gateway software service data object C1, the gateways software service data object C2, the gateways software service data object C3, the inventory software service data object C2, the inventory software service data object C3, and the identity software service data object C1) as shown in the example service dependency graph user interface 1200 in connection with FIG. 12.

In some embodiments, the impacted services selection portion 1307 may provide user interface elements (such as input boxes and/or edit buttons) that allow a user to add or remove software service data objects to or from the impacted services selection portion 1307.

In some embodiments, the example incident data object creation user interface 1300 further comprises a Cancel user interface button 1309 and a Create Incident user interface button 1311. When a user clicks, taps, or otherwise selects the Cancel user interface button 1309, the creation of an incident data object may be canceled. When a user clicks, taps, or otherwise selects the Create Incident user interface button 1311, an incident data object may be generated based on the user input provided through the example incident data object creation user interface 1300, and the user interface may be updated to an incident data object user interface for the just-created incident data object.

Referring now to FIG. 14, an example incident data object user interface 1400 in accordance with some embodiments of the present disclosure is illustrated.

In the example shown in FIG. 14, the example incident data object user interface 1400 comprises a header portion 1402. As shown, the header portion 1402 may indicate the title of the incident data object.

In the example shown in FIG. 14, the example incident data object user interface 1400 comprises a description portion 1404 that is positioned under the header portion 1402. As shown, the description portion 1404 may indicate a description of the incident data object.

In the example shown in FIG. 14, the example incident data object user interface 1400 comprises an impacted services portion 1406 that is positioned under the description portion 1404. As shown, the impacted services portion 1406 may indicate one or more impacted software service data objects associated with the incident data object.

As described above, the impacted software service data objects may be selected based on determining that the service health status data object of a software service data object indicates an unhealthy status, and identifying related software service data objects that are associated with the software service data object according to the service dependency data object. As such, based on the service health status data object and the service dependency data object, various embodiments of the present disclosure may identify impacted service data objects in creating an incident data object.

Additional Implementation Details

Although example processing systems have been described above, implementations of the subject matter and the functional operations described herein can be implemented in other types of digital electronic circuitry, or in computer software, firmware, or hardware, including the structures disclosed in this specification and their structural equivalents, or in combinations of one or more of them.

Embodiments of the subject matter and the operations described herein can be implemented in digital electronic circuitry, or in computer software, firmware, or hardware, including the structures disclosed in this specification and their structural equivalents, or in combinations of one or more of them. Embodiments of the subject matter described herein can be implemented as one or more computer programs, i.e., one or more modules of computer program instructions, encoded on computer-readable storage medium for execution by, or to control the operation of, information/data processing apparatus. A computer-readable storage medium can be, or be included in, a computer-readable storage device, a computer-readable storage substrate, a random or serial access memory array or device, or a combination of one or more of them. The computer-readable storage medium can also be, or be included in, one or more separate physical components or media (e.g., multiple CDs, disks, or other storage devices).

The operations described herein can be implemented as operations performed by an information/data processing apparatus on information/data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (Application Specific Integrated Circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or information/data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described herein can be performed by one or more programmable processors executing one or more computer programs to perform actions by operating on input information/data and generating output. Processors suitable for the execution of a computer program include, by way of example, both general and special purpose microprocessors, and any one or more processors of any kind of digital computer. Generally, a processor will receive instructions and information/data from a read-only memory, a random-access memory, or both. The essential elements of a computer are a processor for performing actions in accordance with instructions and one or more memory devices for storing instructions and data. Generally, a computer will also include, or be operatively coupled to receive information/data from or transfer information/data to, or both, one or more mass storage devices for storing data, e.g., magnetic, magneto-optical disks, or optical disks. However, a computer needs not have such devices. Devices suitable for storing computer program instructions and information/data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described herein can be implemented on a computer having a display device, e.g., an LCD monitor, for displaying information/data to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described herein can be implemented in a computing system that includes a back-end component, e.g., as an information/data server, or that includes a middleware component, e.g., an application server, or that includes a front-end component, e.g., a client device having a graphical user interface or a web browser through which a user can interact with an implementation of the subject matter described herein, or any combination of one or more such back-end, middleware, or front-end components. The components of the system can be interconnected by any form or medium of digital information/data communication, e.g., a communication network. Examples of communication networks include a local area network ("LAN") and a wide area network ("WAN"), an internetwork (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits information/data (e.g., an HTML (Hypertext Markup Language) page) to a client device (e.g., for purposes of displaying information/data to and receiving user input from a user interacting with the client device). Information/data generated at the client device (e.g., a result of the user interaction) can be received from the client device at the server.

While this specification contains many specific implementation details, these should not be construed as limitations on the scope of any disclosures or of what may be claimed, but rather as description of features specific to particular embodiments of particular disclosures. Certain features that are described herein in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results, unless described otherwise. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results, unless described otherwise. In certain implementations, multitasking and parallel processing may be advantageous.

Many modifications and other embodiments of the disclosures set forth herein will come to mind to one skilled in the art to which these disclosures pertain having the benefit of the teachings presented in the foregoing description and the associated drawings. Therefore, it is to be understood that the disclosures are not to be limited to the specific embodiments disclosed and that modifications and other embodiments are intended to be included within the scope of the appended claims. Although specific terms are employed herein, they are used in a generic and descriptive sense only and not for purposes of limitation, unless described otherwise.

The invention claimed is:

1. An apparatus for generating service health status data objects associated with one or more software service data objects in a cloud-based software service system, the apparatus comprising at least one processor and at least one non-transitory memory comprising program code, the at least one non-transitory memory and the program code being configured to, with the at least one processor, cause the apparatus to at least:

receive one or more metric-based alert data objects associated with the cloud-based software service system from a service system metric monitoring platform, wherein the service system metric monitoring platform is external to the cloud-based software service system;

retrieve, from a service health status monitoring data repository, one or more metric-based rule data objects comprising user-defined mapping metadata that defines a plurality of mappings between the one or more metric-based alert data objects and the one or more software service data objects;

generate a service health status data object associated with a software service data object of the one or more software service data objects by:

traversing the one or more metric-based alert data objects to extract system-monitored metric metadata, establishing a connection between at least one metric-based alert data object of the one or more metric-based alert data objects and the software service data object that is not provided by the service system metric monitoring platform by programmatically correlating the at least one metric-based alert data object with the software service data object based at least in part on the system-monitored metric metadata and the user-defined mapping metadata, and generating service health status metadata of the service health status data object based on the at least one metric-based alert data object, wherein the service health status metadata indicates a software service health level of the software service data object; and cause rendering of a health status monitoring user interface on a client device, wherein the health status monitoring user interface comprises a service health status user interface object corresponding to the software service data object based at least in part on the service health status data object and an impacted services user interface button; and in response to receiving a user selection input of the impacted services user interface button, cause rendering of a service dependency graph user interface on the client device.

2. The apparatus of claim 1, wherein the one or more metric-based alert data objects comprise at least one of one or more system alert data objects or one or more system metric data objects.

3. The apparatus of claim 1, wherein the user-defined mapping metadata comprises metric-to-service mapping indicator and metric-to-health mapping indicator.

4. The apparatus of claim 3, wherein the metric-to-service mapping indicator comprises one or more software service identification criteria and one or more software service data object identifiers, wherein each of the one or more software service identification criteria corresponds to one of the one or more software service data object identifiers, wherein each of the one or more software service data object identifiers is associated with one of the one or more software service data objects.

5. The apparatus of claim 4, wherein, when programmatically relating the at least one metric-based alert data objects with the software service data object, the at least one non-transitory memory and the program code are configured to, with the at least one processor, cause the apparatus to:

determine whether the system-monitored metric metadata satisfies a software service identification criterion of the one or more software service identification criteria; and in response to determining that the system-monitored metric metadata satisfies the software service identification criterion:

determine a software service data object identifier corresponds to the software service identification criterion; and select the software service data object corresponding to the software service data object identifier.

6. The apparatus of claim 5, wherein the metric-to-health mapping indicator comprises one or more software service health criteria and one or more software service health level identifiers, wherein each of the one or more software service health criteria corresponds to one of the one or more software service health level identifiers, wherein each of the one or more software service health level identifiers indicates a corresponding software service health level.

7. The apparatus of claim 6, wherein, when generating the service health status metadata of the service health status data object, the at least one non-transitory memory and the program code are configured to, with the at least one processor, cause the apparatus to:

determine whether the system-monitored metric metadata satisfies a software service health criterion of the one or more software service health criteria; and in response to determining that the system-monitored metric metadata satisfies the software service health criterion:

determine a software service health level identifier corresponds to the software service health criterion; and determine the service health status metadata based at least in part on the software service health level identifier.

8. The apparatus of claim 1, wherein the at least one non-transitory memory and the program code are configured to, with the at least one processor, cause the apparatus to:

retrieve a service dependency data object associated with the cloud-based software service system, wherein the service dependency data object comprises service dependency metadata associated with the one or more software service data objects;

determine at least one related software service data object associated with the software service data object based at least in part on the service dependency metadata of the service dependency data object;

determine at least one related service health status data object associated with the at least one related software service data object, wherein the at least one related service health status data object indicates at least one related software service health level of the at least one related software service data object; and adjust, based at least in part on the at least one related service health status data object, the service health status metadata of the service health status data object.

9. The apparatus of claim 8, wherein, when adjusting the service health status metadata of the service health status data object based at least in part on the at least one related service health status data object, the at least one non-transitory memory and the program code are configured to, with the at least one processor, cause the apparatus to:

determine whether the at least one related service health status data object indicates a healthy status or an unhealthy status.

10. The apparatus of claim 9, wherein the at least one non-transitory memory and the program code are configured to, with the at least one processor, cause the apparatus to:

in response to determining that the at least one related service health status data object indicates the unhealthy status, decrease the software service health level associated with the software service data object.

11. The apparatus of claim 9, wherein the at least one non-transitory memory and the program code are configured to, with the at least one processor, cause the apparatus to:

in response to determining that the at least one related service health status data object indicates the healthy status, increase the software service health level associated with the software service data object.

12. A computer-implemented method for generating service health status data objects associated with one or more software service data objects in a cloud-based software service system, comprising:

receiving one or more metric-based alert data objects associated with the cloud-based software service system from a service system metric monitoring platform, wherein the service system metric monitoring platform is external to the cloud-based software service system;

retrieving, from a service health status monitoring data repository, one or more metric- based rule data objects comprising user-defined mapping metadata that defines a plurality of mappings between the one or more metric-based alert data objects and the one or more software service data objects;

generating a service health status data object associated with a software service data object of the one or more software service data objects by:

traversing the one or more metric-based alert data objects to extract system-monitored metric metadata, establishing a connection between at least one metric-based alert data object of the one or more metric-based alert data objects and the software service data object that is not provided by the service system metric monitoring platform by programmatically correlating the at least one metric-based alert data object with the software service data object based at least in part on the system-monitored metric metadata and the user-defined mapping metadata, and generating service health status metadata of the service health status data object based on the at least one metric-based alert data object, wherein the service health status metadata indicates a software service health level of the software service data object; and causing rendering of a health status monitoring user interface on a client device, wherein the health status monitoring user interface comprises a service health status user interface object corresponding to the software service data object based at least in part on the service health status data object and an impacted services user interface button; and in response to receiving a user selection input of the impacted services user interface button, cause rendering of a service dependency graph user interface on the client device.

13. The computer-implemented method of claim 12, wherein the one or more metric-based alert data objects comprise at least one of one or more system alert data objects or one or more system metric data objects.

14. The computer-implemented method of claim 12, wherein the user- defined mapping metadata comprises metric-to-service mapping indicator and metric-to-health mapping indicator.

15. The computer-implemented method of claim 14, wherein the metric-to- service mapping indicator comprises one or more software service identification criteria and one or more software service data object identifiers, wherein each of the one or more software service identification criteria corresponds to one of the one or more software service data object identifiers, wherein each of the one or more software service data object identifiers is associated with one of the one or more software service data objects.

16. The computer-implemented method of claim 15, wherein, when programmatically relating the at least one metric-based alert data objects with the software service data object, the computer-implemented method further comprises:

determining whether the system-monitored metric metadata satisfies a software service identification criterion of the one or more software service identification criteria; and in response to determining that the system-monitored metric metadata satisfies the software service identification criterion:

determining a software service data object identifier corresponds to the software service identification criterion; and selecting the software service data object corresponding to the software service data object identifier.

17. The computer-implemented method of claim 16, wherein the metric-to- health mapping indicator comprises one or more software service health criteria and one or more software service health level identifiers, wherein each of the one or more software service health criteria corresponds to one of the one or more software service health level identifiers, wherein each of the one or more software service health level identifiers indicates a corresponding software service health level.

18. The computer-implemented method of claim 17, wherein, when generating the service health status metadata of the service health status data object, the computer-implemented method further comprises:

determining whether the system-monitored metric metadata satisfies a software service health criterion of the one or more software service health criteria; and in response to determining that the system-monitored metric metadata satisfies the software service health criterion:

determining a software service health level identifier corresponds to the software service health criterion; and determining the service health status metadata based at least in part on the software service health level identifier.

19. The computer-implemented method of claim 12, further comprising:

retrieving a service dependency data object associated with the cloud-based software service system, wherein the service dependency data object comprises service dependency metadata associated with the one or more software service data objects;

determining at least one related software service data object associated with the software service data object based at least in part on the service dependency metadata of the service dependency data object;

determining at least one related service health status data object associated with the at least one related software service data object, wherein the at least one related service health status data object indicates at least one related software service health level of the at least one related software service data object; and adjusting, based at least in part on the at least one related service health status data object, the service health status metadata of the service health status data object.

20. A computer program product for generating service health status data objects associated with one or more software service data objects in a cloud-based software service system, the computer program product comprising at least one non-transitory computer-readable storage medium having computer-readable program code portions stored therein, the computer-readable program code portions comprising an executable portion configured to:

receive one or more metric-based alert data objects associated with the cloud-based software service system from a service system metric monitoring platform, wherein the service system metric monitoring platform is external to the cloud-based software service system;

retrieve, from a service health status monitoring data repository, one or more metric-based data objects comprising user-defined mapping metadata that defines a plurality of mappings between the one or more metric-based alert data objects and the one or more software service data objects;

generate a service health status data object associated with a software service data object of the one or more software service data objects by:

traversing the one or more metric-based alert data objects to extract system-monitored metric metadata, establishing a connection between at least one metric-based alert data object of the one or more metric-based alert data objects and the software service data object that is not provided by the service system metric monitoring platform by programmatically correlating the at least one metric-based alert data object with the software service data object based at least in part on the system-monitored metric metadata and the user-defined mapping metadata, and generating service health status metadata of the service health status data object based on the at least one metric-based alert data object, wherein the service health status metadata indicates a software service health level of the software service data object; and cause rendering of a health status monitoring user interface on a client device, wherein the health status monitoring user interface comprises a service health status user interface object corresponding to the software service data object based at least in part on the service health status data object and an impacted services user interface button; and in response to receiving a user selection input of the impacted services user interface button, cause rendering of a service dependency graph user interface on the client device.

* * * * *